United States Patent
Watanabe

(10) Patent No.: US 10,469,712 B2
(45) Date of Patent: Nov. 5, 2019

(54) IMAGE FORMING APPARATUS AND IMAGE FORMING METHOD

(71) Applicant: Ricoh Company, Ltd., Tokyo (JP)

(72) Inventor: Naoto Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/911,202

(22) Filed: Mar. 5, 2018

(65) Prior Publication Data

US 2018/0270397 A1     Sep. 20, 2018

(30) Foreign Application Priority Data

Mar. 17, 2017  (JP) ................................ 2017-053764

(51) Int. Cl.
| | |
|---|---|
| *H04N 1/21* | (2006.01) |
| *H04N 1/50* | (2006.01) |
| *H04N 1/60* | (2006.01) |
| *H04N 1/62* | (2006.01) |

(52) U.S. Cl.
CPC ......... *H04N 1/6033* (2013.01); *H04N 1/2108* (2013.01); *H04N 1/506* (2013.01); *H04N 1/6027* (2013.01); *H04N 1/62* (2013.01)

(58) Field of Classification Search
CPC .... H04N 1/2108; H04N 1/506; H04N 1/6027; H04N 1/6033; H04N 1/62
USPC ......................................... 358/474, 486, 475
See application file for complete search history.

(56) References Cited

U.S. PATENT DOCUMENTS

| | | | |
|---|---|---|---|
| 2004/0109604 A1* | 6/2004 | Kagawa | H04N 1/60 382/167 |
| 2007/0024932 A1* | 2/2007 | Ogatsu | H04N 1/6033 358/518 |
| 2009/0296158 A1* | 12/2009 | Paul | H04N 1/58 358/3.26 |
| 2010/0182366 A1 | 7/2010 | Takagi et al. | |
| 2012/0069128 A1 | 3/2012 | Yamashita et al. | |

(Continued)

FOREIGN PATENT DOCUMENTS

| | | |
|---|---|---|
| JP | 2002-096462 | 4/2002 |
| JP | 2006-264152 | 10/2006 |

(Continued)

*Primary Examiner* — Negussie Worku
(74) *Attorney, Agent, or Firm* — Xsensus LLP

(57) ABSTRACT

An image forming apparatus includes a detector, a calculator, and a corrector. The detector receives brightness values obtained from an image printed based on image data. The image includes a plurality of streaks and non-streak portions having image density differences with the plurality of streaks. The detector detects a first streak width, a first brightness difference between a brightness value of the first streak and a brightness value of a non-streak portions, a second streak width wider than the first streak width, and a second brightness difference between a brightness value of the second streak and a brightness value of a non-streak portion. The calculator calculates a correction coefficient corresponding to the first streak width based on the first brightness difference and the second brightness difference. The corrector corrects an image density corresponding to the first streak width in the image data based on the calculated correction coefficient.

15 Claims, 22 Drawing Sheets

(56) References Cited

U.S. PATENT DOCUMENTS

| | | | |
|---|---|---|---|
| 2013/0155166 A1* | 6/2013 | Watanabe | G02B 26/123 347/224 |
| 2016/0132013 A1* | 5/2016 | Soma | H04N 1/603 358/1.1 |
| 2016/0234403 A1* | 8/2016 | Watanabe | H04N 1/6033 |
| 2016/0274520 A1 | 9/2016 | Soma et al. | |
| 2016/0274521 A1 | 9/2016 | Iwata et al. | |
| 2017/0318172 A1* | 11/2017 | Matsuzaki | H04N 1/00681 |
| 2017/0339317 A1* | 11/2017 | Watanabe | H04N 1/6069 |
| 2018/0176414 A1* | 6/2018 | Iwata | B41J 2/505 |
| 2018/0270397 A1* | 9/2018 | Watanabe | H04N 1/6033 |
| 2019/0171159 A1* | 6/2019 | Watanabe | G03G 21/206 |

FOREIGN PATENT DOCUMENTS

| | | |
|---|---|---|
| JP | 2006-343680 | 12/2006 |
| JP | 2007-088927 | 4/2007 |
| JP | 2007-274204 | 10/2007 |
| JP | 2010-260338 | 11/2010 |

* cited by examiner

| STREAK WIDTH μm | SENSITIVITY | SENSITIVITY RATIO |
|---:|---:|---:|
| 42 | 0.63 | 1.79 |
| 84 | 0.74 | 1.53 |
| 126 | 0.80 | 1.42 |
| 168 | 0.83 | 1.35 |
| 210 | 0.86 | 1.31 |
| 252 | 0.88 | 1.28 |
| 294 | 0.90 | 1.25 |
| 336 | 0.92 | 1.23 |
| 378 | 0.93 | 1.21 |
| 420 | 0.94 | 1.20 |
| 462 | 0.95 | 1.19 |
| 504 | 0.96 | 1.18 |
| 546 | 0.97 | 1.17 |
| 588 | 0.97 | 1.16 |
| 630 | 0.98 | 1.15 |
| 672 | 0.98 | 1.14 |
| 714 | 0.99 | 1.14 |
| 756 | 0.99 | 1.13 |
| 798 | 1.00 | 1.13 |
| 840 | 1.00 | 1.12 |
| 882 | 1.01 | 1.12 |
| 924 | 1.01 | 1.11 |
| 966 | 1.01 | 1.11 |
| 1008 | 1.02 | 1.11 |
| 1050 | 1.02 | 1.10 |
| 1092 | 1.02 | 1.10 |
| 1134 | 1.03 | 1.10 |
| 1176 | 1.03 | 1.09 |
| 1218 | 1.03 | 1.09 |
| 1260 | 1.03 | 1.09 |
| 1302 | 1.04 | 1.09 |
| 1344 | 1.04 | 1.08 |
| 1386 | 1.04 | 1.08 |
| 1428 | 1.04 | 1.08 |
| 1470 | 1.05 | 1.08 |
| 1512 | 1.05 | 1.08 |
| 1554 | 1.05 | 1.07 |
| 1596 | 1.05 | 1.07 |

FIG. 12B

| | | |
|---|---|---|
| 1638 | 1.05 | 1.07 |
| 1680 | 1.05 | 1.07 |
| 1722 | 1.06 | 1.07 |
| 1764 | 1.06 | 1.07 |
| 1806 | 1.06 | 1.06 |
| 1848 | 1.06 | 1.06 |
| 1890 | 1.06 | 1.06 |
| 1932 | 1.06 | 1.06 |
| 1974 | 1.06 | 1.06 |
| 2016 | 1.07 | 1.06 |
| 2058 | 1.07 | 1.06 |
| 2100 | 1.07 | 1.06 |
| 2142 | 1.07 | 1.05 |
| 2184 | 1.07 | 1.05 |
| 2226 | 1.07 | 1.05 |
| 2268 | 1.07 | 1.05 |
| 2310 | 1.07 | 1.05 |
| 2352 | 1.07 | 1.05 |
| 2394 | 1.08 | 1.05 |
| 2436 | 1.08 | 1.05 |
| 2478 | 1.08 | 1.05 |
| 2520 | 1.08 | 1.05 |
| 2562 | 1.08 | 1.04 |
| 2604 | 1.08 | 1.04 |
| 2646 | 1.08 | 1.04 |
| 2688 | 1.08 | 1.04 |
| 2730 | 1.08 | 1.04 |
| 2772 | 1.08 | 1.04 |
| 2814 | 1.08 | 1.04 |
| 2856 | 1.08 | 1.04 |
| 2898 | 1.08 | 1.04 |
| 2940 | 1.09 | 1.04 |
| 2982 | 1.09 | 1.04 |
| 3024 | 1.09 | 1.04 |

WIDTH 84 μm

WIDTH 336 μm

WIDTH 2688 μm

FIG. 26
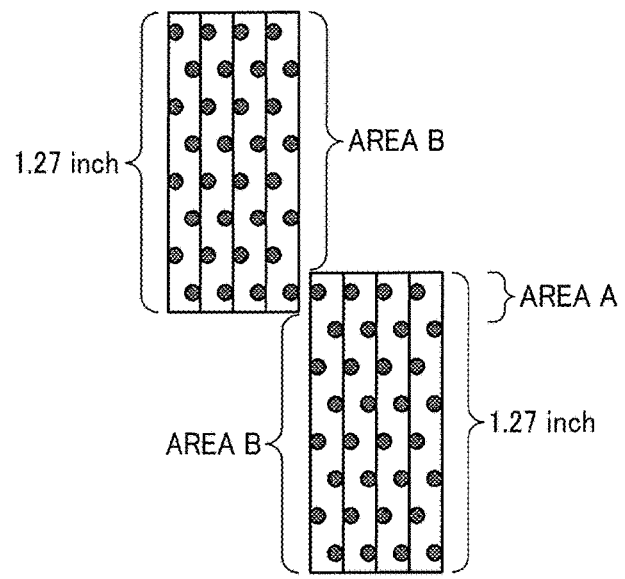
FIG. 27A    FIG. 27B    FIG. 27C    FIG. 27D
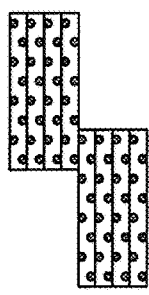 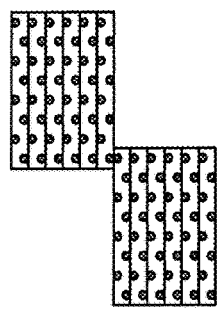 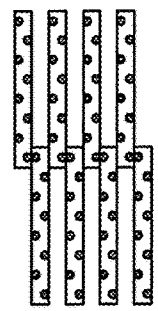 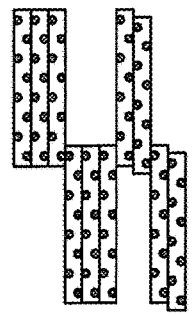

IMAGE FORMING APPARATUS AND IMAGE FORMING METHOD

CROSS-REFERENCE TO RELATED APPLICATION

This patent application is based on and claims priority pursuant to 35 U.S.C. § 119 to Japanese Patent Application No. 2017-053764, filed on Mar. 17, 2017, in the Japanese Patent Office, the entire disclosure of which is hereby incorporated by reference herein.

BACKGROUND

Technical Field

Embodiments of the present disclosure generally relate to an image forming apparatus and an image forming method.

Background Art

Conventionally, some image forming apparatuses correct an image density value of input image data to eliminate image defects such as streaks. Hereinafter, these image defects may be referred to as "vertical streaks".

For example, in a laser printer or the like having a photoconductor, the vertical streaks are often generated by a charger that charges the photoconductor using a corona discharge generator called a scorotron. In addition, gentle image density deviations are often generated by a gap deviation between the photoconductor and a developing sleeve (sometimes referred to as a "process gap"). Further, the gentle image density deviations may occur due to a deviation of a gap between the developing sleeve and a regulating member to regulate the developer in a developing device.

Various factors can cause the gentle image density deviations or sharp image density deviations. The sharp image density deviations that occur in a range of less than or equal to 10 mm look like vertical streaks. The image density deviations that occur in a range of 10 mm to 100 mm look like vertical bands. Other gentle image density deviations that occur in a range wider than 100 mm are an image density unevenness or an image density deviation.

SUMMARY

This specification describes an improved image processing apparatus. In one illustrative embodiment, the image processing apparatus includes a detector, a calculator, and a corrector. The detector receives brightness values obtained from an image printed based on image data. The image includes a plurality of streaks and non-streak portions having image density differences with the plurality of streaks. The detector detects a first streak width of a first steak, a first brightness difference between a brightness value of the first streak and a brightness value of the non-streak portions, a second streak width of a second streak wider than the first streak width, and a second brightness difference between a brightness value of the second streak and a brightness value of the non-streak portions. The calculator calculates a correction coefficient corresponding to the first streak width based on the first brightness difference and the second brightness difference. The corrector corrects an image density corresponding to the first streak width in the image data based on the correction coefficient calculated by the calculator.

This specification further describes an improved method of forming, on a recording medium, a plurality of streaks based on predetermined image data, each of the plurality of streaks having an image density difference from an adjacent region that is a non-streak portion; reading brightness values of the non-streak portion and the plurality of streaks; detecting, based on the brightness values read by the reading, a first streak width of a first streak, a first brightness difference between a brightness value of the first streak and a brightness value of the non-streak portion corresponding to the first streak, a second streak width of a second streak wider than the first streak width, and a second brightness difference between a brightness value of the second streak and a brightness value of the non-streak portion corresponding to the second streak; calculating a correction coefficient corresponding to the first streak width based on the first brightness difference and the second brightness difference; and correcting image data of an image density value corresponding to the first streak width, based on the correction coefficient calculated by the calculator.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 12 (consisting of FIG. 12A and FIG. 12B) is a data table of an example of the sensitivity and a sensitivity ratio with respect to the streak width;

FIG. 26 is an explanatory diagram illustrating an example of a combined head in a print head unit;

FIGS. 27A, 27B, 27C, and 27D (collectively referred to as FIG. 27) are explanatory diagrams illustrating other examples of the combined head in a print head unit;

Figure 1:
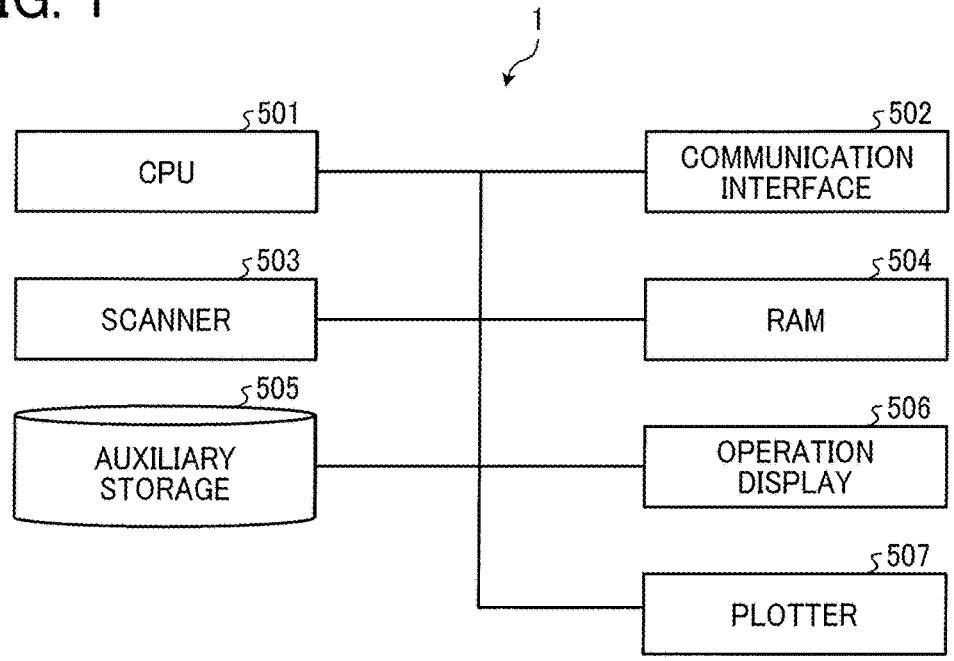
FIG. 1 is a block diagram illustrating an example of a hardware configuration of an image forming apparatus according to the first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected, and it is to be understood that each specific element includes all technical equivalents that have a similar function, operate in a similar manner, and achieve a similar result.

As used herein, the singular forms "a", "an" and "the" are intended to include the plural forms as well, unless the context clearly indicates otherwise. The configurations related to the present disclosure are described based on embodiments illustrated in the accompanied drawings. It is to be noted that identical reference numerals are assigned to identical components or equivalents and description of those components is simplified or omitted.

First Embodiment

With reference to FIG. 1, the hardware configuration of the image forming apparatus according to the present embodiment is described. The image forming apparatus according to the present embodiment is a multifunction peripheral (MFP) having at least two functions of a copy function, a printer function, a scanner function, and a facsimile function. However, the image forming apparatus according to the present disclosure is not limited to this and may be any image forming apparatus that outputs an image, such as copiers, printers, or the like.

As illustrated in FIG. 1, the MFP 1 as an example of the image forming apparatus according to the present embodiment includes a central processing unit (CPU) 501, a communication interface (I/F) 502, a scanner 503, a random access memory (RAM) 504, an auxiliary storage 505, an operation display 506, and a plotter 507.

The CPU 501 is a processor that comprehensively controls operations of the MFP 1.

The communication I/F 502 is an interface to perform data communication with an external device. For example, the communication I/F 502 receives image data from a host device. In the following description, the image data received from the host device may be referred to as "input image data".

The scanner 503 is a device for optically reading an image formed on a recording medium such as a sheet by a plotter 507 under control of the CPU 501. The scanner 503 includes, for example, a line sensor and the like. As the configuration of the scanner 503, various known scanner configurations can be used.

The RAM 504 is a volatile storage device used as a work area of the CPU 501.

The auxiliary storage 505 is a nonvolatile storage device that stores image data received from the host device, image data of a streak detection chart described later, and the like. Additionally, the auxiliary storage 505 stores correction data obtained by a calculation process of a correction coefficient described later. Specifically, the auxiliary storage 505 stores the correction data for each of a plurality of colors that corresponds to the correction coefficient to eliminate a vertical streak. The correction data corresponds to each of types of screening and each of widths of the vertical streaks. (Hereinafter, the width of the vertical streak may be referred to as a "streak width".) The widths of the vertical streaks are expressed by image data that corresponds to each of the plurality of colors. The types of screening indicates whether halftone dots are made by amplitude modulation screening (hereinafter, referred to as AM screening) or frequency modulation screening (hereinafter, referred as FM screening) and, in the AM screening, a number of lines and screen angle. In addition, in the present embodiment, the auxiliary storage 505 stores correction data corresponding to four colors, cyan, magenta, yellow, and black.

The auxiliary storage 505 is, for example, a hard disk drive (HDD) or a solid state drive (SSD).

The operation display 506 is, for example, a touch panel or the like, and is a device that receives input to the CPU 501, which performs an operation function, and displays the state and the like of the MFP 1, which performs display function.

The plotter 507 is a device that implements a printing function and forms an image (for example, printing the image on the recording medium) based on image data under the control of the CPU 501. The plotter 507 prints, for example, the image data of the streak detection chart, image data before correction for the vertical streak, image data after correction for the vertical streak, and the like on the recording medium. Furthermore, the plotter 507 fixes toner images corresponding to the image data on the recording medium.

The plotter 507 includes an image forming unit corresponding to each of toners, cyan, magenta, yellow and black toners that includes a photoconductor, a charger, a developing device, and a photoconductor cleaner. The plotter 507 also includes an exposure device and a fixing device. In the plotter 507, the image is formed on the recording medium as follows. In accordance with the image data, the exposure device emits a light beam, that is, irradiates each of the photoconductors, to create an electrostatic latent image on each photoconductor for each toner color. Thus, the developing device develops the electrostatic latent image with each toner to form a toner image on the photoconductor.

After the toner images formed on the photoconductor are primarily transferred onto an intermediate transfer belt as a single composite toner image, the consolidated toner image transferred onto the intermediate transfer belt is then secondarily transferred onto the recording medium. The fixing device fixes the toner image transferred onto the recording medium by heating and pressurizing at a temperature within a predetermined range. Thus, the plotter 507 forms the image on the recording medium. Since the configuration of the plotter 507 is well known, a detailed description thereof is omitted here. As the configuration of the plotter 507, various known printer engine configurations can be used. The recording medium is not limited to paper.

The hardware configuration of the MFP 1 illustrated in FIG. 1 is an example and may include other components.

Figure 2:
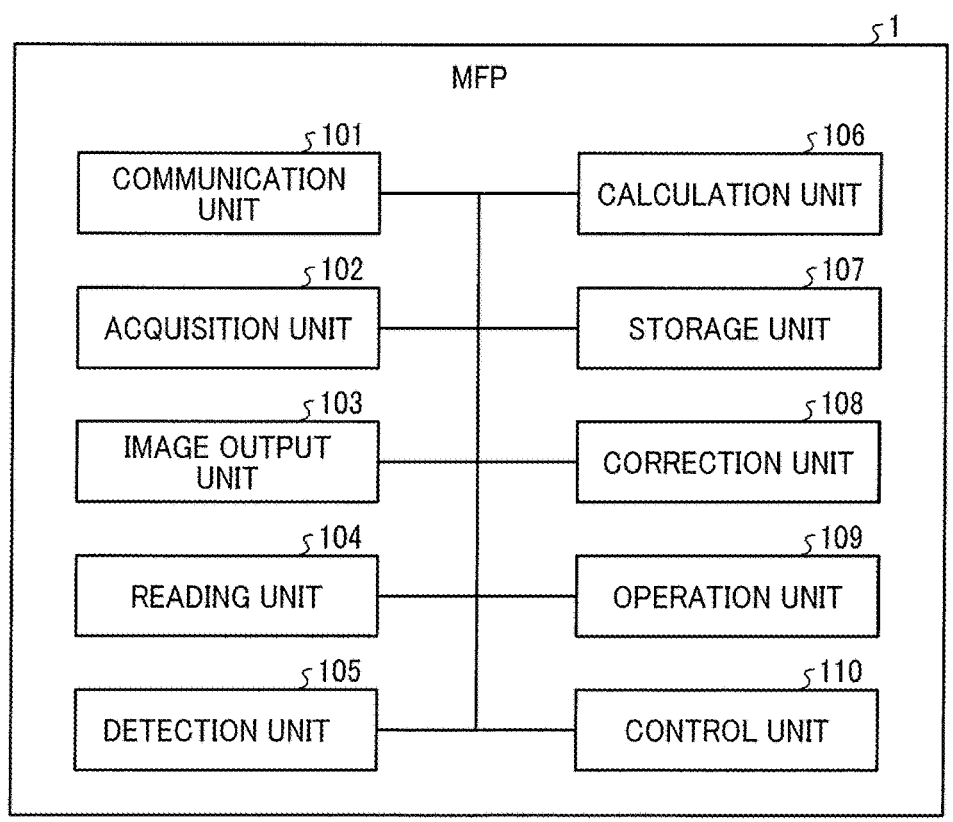
FIG. 2 is a functional block diagram illustrating an example of a functional block of an image forming apparatus according to the first embodiment.

A functional block of the image forming apparatus is described below. FIG. 2 is a functional block diagram illustrating an example of a functional block of an image forming apparatus according to the first embodiment. With reference to FIG. 2, the functional block configuration of the image forming apparatus according to the present embodiment is described.

As illustrated in FIG. 2, the MFP 1 according to the present embodiment includes a communication unit 101, an acquisition unit 102, an image output unit 103 that is an image forming section, a reading unit 104, a detection unit 105, a calculation unit 106, a storage unit 107, a correction unit 108, an operation unit 109, and a control unit 110.

The communication unit 101 is a functional block for data communication with an external device. The communication interface (I/F) 502 illustrated in FIG. 1 implements the communication unit 101.

The acquisition unit 102 is a functional block that acquires image data for image formation output or image data for correction processing which the correction unit 108 proceeds, which are sent from an external device via the communication unit 101. The CPU 501 illustrated in FIG. 1 executing a program, for example, implements the acquisition unit 102.

The image output unit 103 is a functional block that prints the image data of the streak detection chart described later, the image data before correction for the vertical streak, the image data after correction for the vertical streak, and the like on the recording medium under the control of the control unit 110. The plotter 507 illustrated in FIG. 1 implements the image output unit 103.

The reading unit 104 is a functional block that reads the image on the recording medium. The image is formed based on the image data. When reading the image on the recording medium, the reading unit 104 reads the image and converts the image into a brightness value indicated by a value of "0" (dark) to "255" (bright) in the case of 8 bits. The scanner 503 illustrated in FIG. 1 implements the reading unit 104.

The detection unit 105 is a functional block that detects a streak from the image on the recording medium read by the reading unit 104. Specifically, the detection unit 105 detects whether the vertical streak and a horizontal streak exist on the streak detection chart described later printed on the recording medium to calculate the correction coefficient. Further, the detection unit 105 detects whether the vertical streak exists on the image to be corrected, which is printed on the recording medium. The specific method of detecting streaks by the detection unit 105 is described later. The CPU 501 illustrated in FIG. 1 executing a program, for example, implements the detection unit 105.

The calculation unit 106 is a functional block that calculates the correction coefficient in each of the streak widths based on a brightness difference that is the difference between the brightness value of the streak and the non-streak portion in the streak detection chart detected by the detection unit 105. The calculation method of the correction coefficient by the calculation unit 106 is described later. For example, The CPU 501 illustrated in FIG. 1 executing a program implements the calculation unit 106.

The storage unit 107 is a functional block that stores the correction data including the correction coefficient calculated by the calculation unit 106. Further, the storage unit 107 stores the image data received from the host device, the image data of a streak detection chart described later, and the like. The auxiliary storage 505 illustrated in FIG. 1 implements the storage unit 107.

The correction unit 108 is a functional block that corrects an image density value with respect to the image data to be corrected based on the correction coefficient corresponding to the streak width of the streak detected by the detection unit 105. The correction processing by the correction unit 108 is described later. For example, The CPU 501 illustrated in FIG. 1 executing a program implements the correction unit 108.

The operation unit 109 is a functional block that receives an operation input by a user such as a touch input and a software key input. A touch input function of the operation display 506 illustrated in FIG. 1 implements the operation unit 109. The operation display 506 may have a touch input function of a touch panel, a hardware switch, or the like. In this case, this hardware switch or the like implements the operation unit 109.

The control unit 110 is a functional block that controls an entire processing of the MFP 1. For example, the CPU 501 illustrated in FIG. 1 executing a program implements the control unit 110.

Some or all of the acquisition unit 102, the detection unit 105, the calculation unit 106, the correction unit 108, and the control unit 110 are not always implemented by software programs, but may be implemented by a hardware such as an application specific integrated circuit (ASIC) or an field-programmable gate array (FPGA).

The functional blocks illustrated in FIG. 2 that are the communication unit 101, the acquisition unit 102, the image output unit 103, the reading unit 104, the detection unit 105, the calculation unit 106, the storage unit 107, the correction unit 108, the operation unit 109 and the control unit 110 are conceptual representations of functions and are not limited to a specific structure. For example, a plurality of independent functional blocks in the MFP 1 illustrated in FIG. 2 may be configured as one functional unit. On the other hand, in the MFP 1 illustrated in FIG. 2, the function of one functional block may be divided into a plurality of functional blocks.

Vertical streaks in the types of screening are described below.

Figure 3:
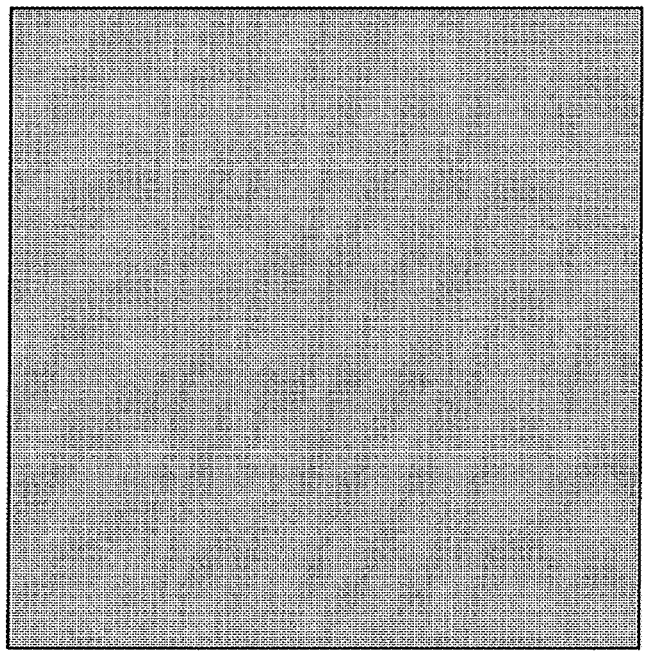
FIG. 3 is a diagram illustrating a gray image of an image density value of 30%.
Figure 4:
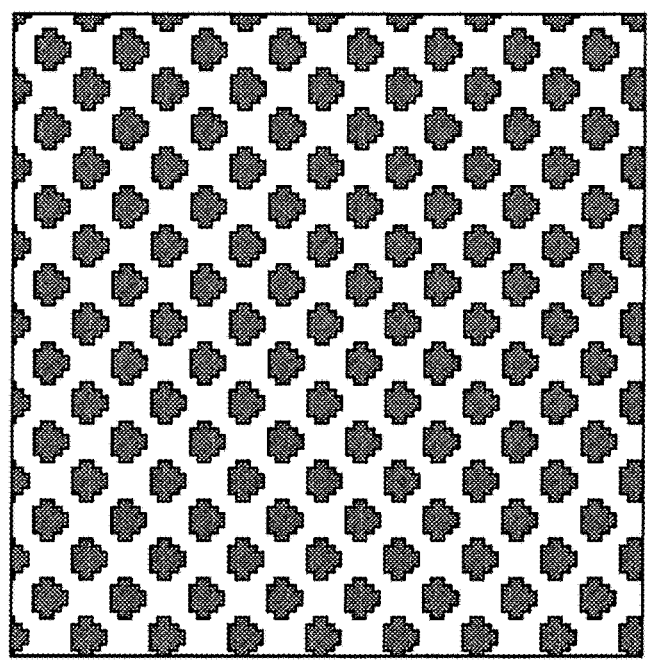
FIG. 4 is an enlarged view of an amplitude modulation (AM) screen of 270 lines drawn based on image data of the image illustrated in FIG. 3.
Figure 5:
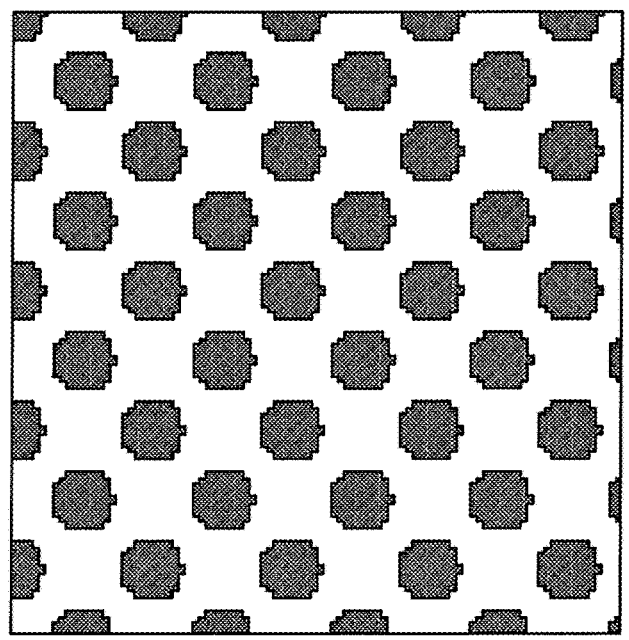
FIG. 5 is an enlarged view of an AM screen of 175 lines drawn based on image data of the image illustrated in FIG. 3.

FIG. 3 is a diagram illustrating a gray image of an image density value of 30%. FIG. 4 is an enlarged view of an amplitude modulation (AM) screen (hereinafter, referred as AM screen) of 270 lines drawn based on image data of the image illustrated in FIG. 3. FIG. 5 is an enlarged view of an AM screen of 175 lines drawn based on image data of the image illustrated in FIG. 3. With reference to FIGS. 3 to 5, the AM screens of screenings are described.

FIG. 3 illustrates the gray image (image density value: 30%) that is an original image of images printed as the AM screen illustrated in FIGS. 4 and 5. The image density value corresponds to a pixel value indicating the image density of each color of cyan, magenta, yellow, and black of the pixels constituting the image data. For example, when the pixel values are configured by 8 bits, a pixel value of the brightest image density is "0" and a pixel value of the darkest image density is "255". In the case of 8 bits, the image density value of 100% corresponds to the pixel value of "255", and the image density value of 0% corresponds to the pixel value of "0". It is assumed that the image data here is converted from data in a color space configured by red, green, and blue (RGB) to data in a color space configured by cyan, magenta, yellow, and black.

FIG. 4 is an enlarged view of an area of 1 mm square in an image printed by the AM screening of 270 lines based on the image data of the image illustrated in FIG. 3. FIG. 5 is an enlarged view of an area of 1 mm square in an image printed by the AM screening of 175 lines based on the image data of the image illustrated in FIG. 3. In the image data of the image illustrated in FIG. 3, the halftone is represented using 8-bit gradation in one pixel, whereas, in the AM screen as illustrated in FIGS. 4 and 5, the halftone is represented using dot area on the recording medium. In the example of the AM screen illustrated in FIGS. 4 and 5, an example of binary black and white screening is illustrated, but the correction processing for the vertical streak described later is not limited to the binary screening, and alternatively, may be applied to any screening using multivalue image processing such as a screening using four values, black, dark gray, light gray, and white.

The type of screening greatly affects the width of the vertical streak (the streak width) occurring in the image printed on the recording medium. In particular, the coarse line number worsens reproducibility of the vertical streak. The reproducibility of the vertical streak is described with reference to FIGS. 6 to 8 below.

Figure 6:
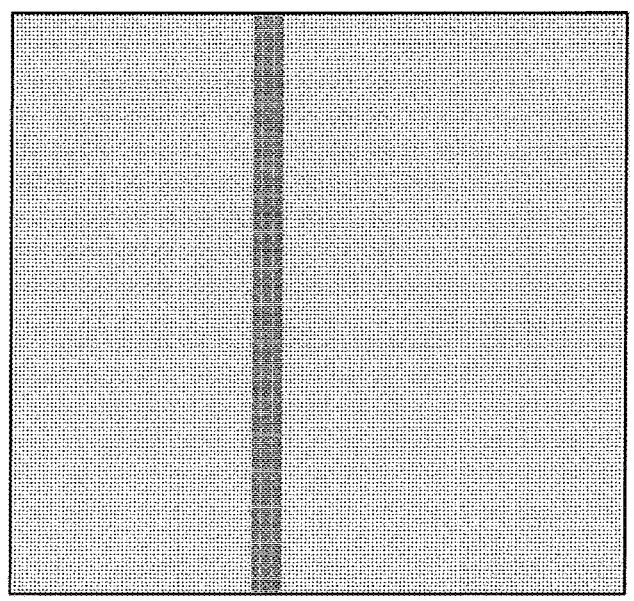
FIG. 6 is a diagram illustrating an example of a vertical streak in the gray image of the image density value of 30%.
Figure 7:
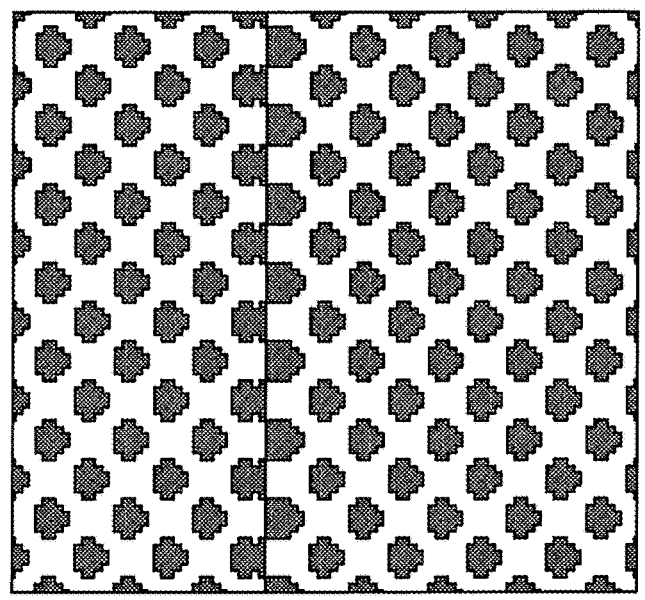
FIG. 7 is an enlarged view of an AM screen of 270 lines drawn based on image data of the image including the vertical streak illustrated in FIG. 6.
Figure 8:
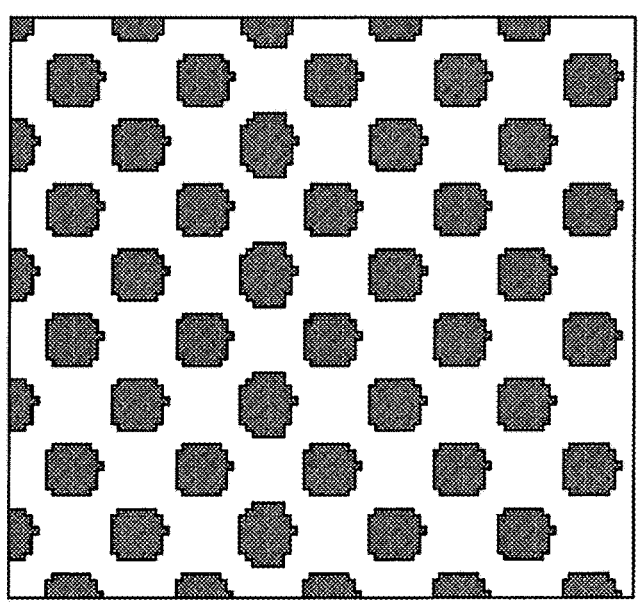
FIG. 8 is an enlarged view of an AM screen of 175 lines drawn based on image data of the image including the vertical streak illustrated in FIG. 6.

FIG. 6 is a diagram illustrating an example of the vertical streak in the gray image of the image density value of 30%. FIG. 7 is an enlarged view of the AM screen of 270 lines drawn based on image data of the image including the vertical streak illustrated in FIG. 6. FIG. 8 is an enlarged view of the AM screen of 175 lines drawn based on the image data of the image including the vertical streak illustrated in FIG. 6. With reference to FIGS. 6 to 8, reproducibility of the vertical streak in the AM screen is described.

FIG. 6 illustrates the vertical streak having a width of 84 μm in the gray image (image density value: 30%) illustrated in FIG. 3. FIG. 7 is the enlarged view of an area of 1 mm square including the vertical streak in an image printed by the AM screening of 270 lines based on the image data of the image illustrated in FIG. 6. FIG. 8 is an enlarged view of an area of 1 mm square including the vertical streak in an image printed by the AM screening of 175 lines based on the image data of the image illustrated in FIG. 6.

In the AM screening, since the halftone is represented by using the dot area on the recording medium, the vertical streak having the width of 84 μm cannot be reproduced perfectly as in the original image illustrated in FIG. 6. As described above, the coarse line number worsens reproducibility of the vertical streak. When comparing the AM screening of 270 lines used in high definition printing with the AM screening of 175 lines used in normal printing, the reproducibility of the vertical streak having the width of 84 μm is very different. The reproducibility of the vertical streak in the AM screen of 175 lines illustrated in FIG. 8 is worse than the one in the AM screen of 270 lines illustrated in FIG. 7. That is, the AM screen with a larger number of lines is easier to reproduce the vertical streak. As the number of lines in the AM screen decreases, the reproducibility of the vertical streak deteriorates.

The reproducibility of the vertical streak in the AM screen has been described. Next, the reproducibility of the vertical streak in the FM screen is described.

Figure 9:
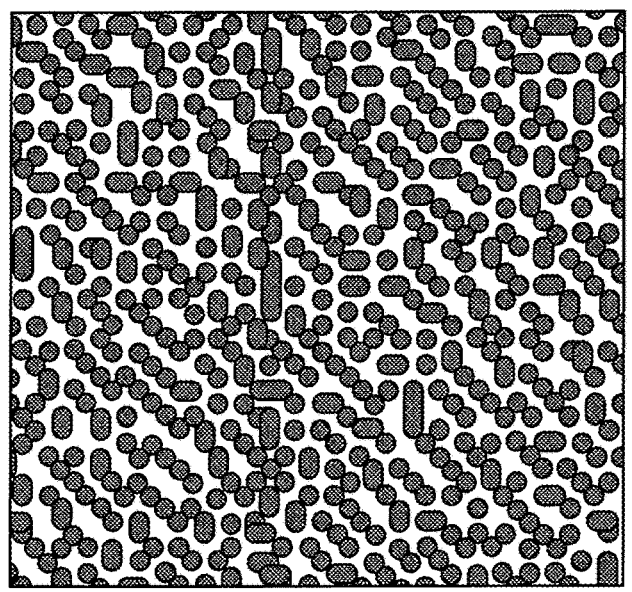
FIG. 9 is an enlarged view of a frequency modulation (FM) screen drawn based on image data of the image including the vertical streak illustrated in FIG. 6.

FIG. 9 is an enlarged view of the FM screen drawn based on image data of the image including the vertical streak. With reference to FIG. 9, reproducibility of the vertical streak in the FM screen is described.

The FM screen has no screen angle in the AM screen illustrated in FIGS. 4 and 5. The FM screen represents the halftone using the dot density per unit area. Similar to the AM screen, since the area occupied by dots per unit area represents the halftone, the reproducibility of the vertical streak is the same as the AM screen. FIG. 9 is the enlarged view of an area of 1 mm square including the vertical streak in an image printed by the FM screening based on the image data of the image illustrated in FIG. 6. In FIG. 9, vertical streaks are processed by an error diffusion method. As illustrated in FIG. 9, the FM screening as well as the AM screening cannot completely reproduce the vertical streak.

Sensitivity of the reading unit is described below.

Figure 10:
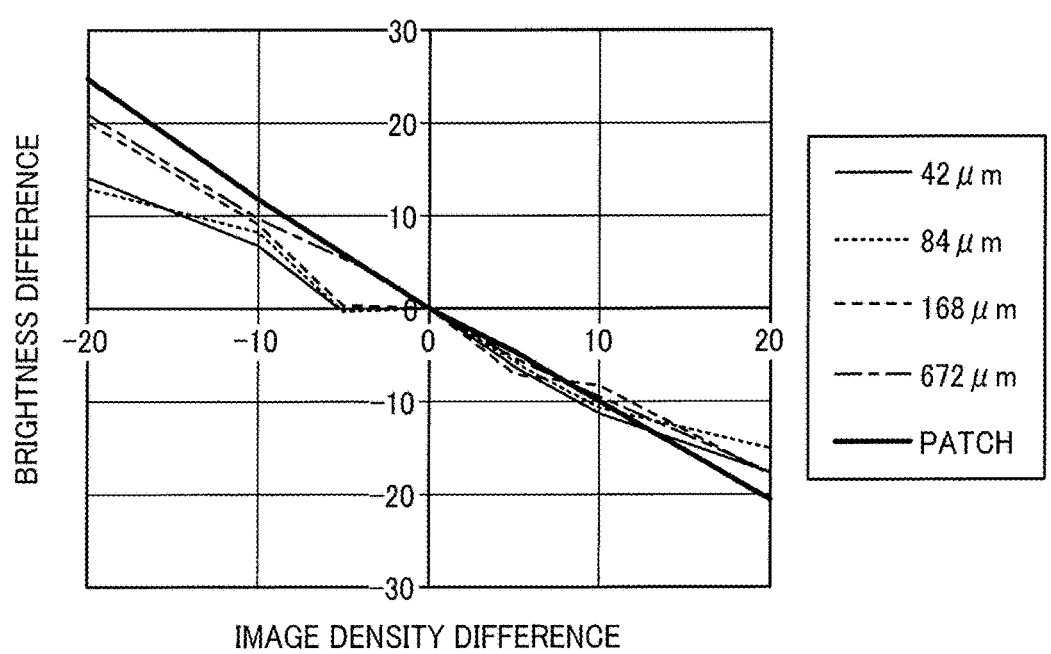
FIG. 10 is an example of a graph illustrating a relationship between an image density difference and a brightness difference.
Figure 11:
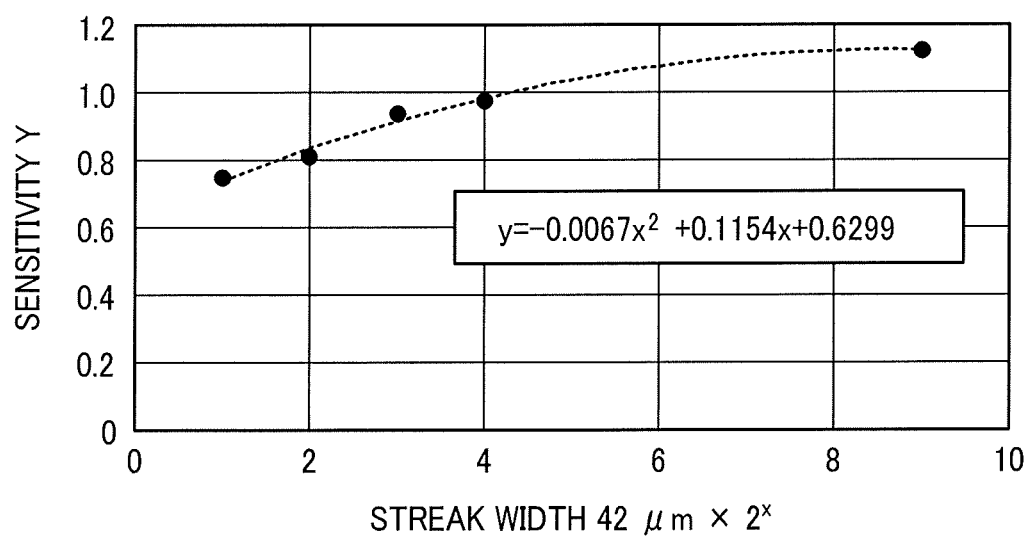
FIG. 11 is an example of a graph illustrating a relationship between streak width and sensitivity.

FIG. 10 is an example of a graph illustrating a relationship between an image density difference and a brightness difference. FIG. 11 is an example of a graph illustrating a relationship between the streak width and the sensitivity. FIG. 12 is a data table of an example of the sensitivity and a sensitivity ratio with respect to the streak width. With reference to FIGS. 10 to 12, when the MFP 1 according to the present embodiment prints the image by the FM screening, the sensitivity of reading the image by the reading unit 104 is described.

In the graph illustrated in FIG. 10, experimental results are illustrated. The horizontal axis in FIG. 10 represents the image density difference between the image density values of the streak and a non-streak portion in the image data with the vertical streak having the streak width described in graph legends. MFP 1 printed images using FM screening based on the above image data. The reading unit 104 reads printed images. The vertical axis in FIG. 10 represents the brightness difference between brightness values of the streak and the non-streak portion in the printed image read by the reading unit 104. In FIG. 10, the image density value of the non-streak portion is set to 20%. Data corresponding to "PATCH" at the bottom of the graph legend in FIG. 10 is obtained from patches that do not include the streak. Multiple patches are made based on image data of different image densities. A coordinate on the horizontal axis in "PATCH" in FIG. 10 is the image density difference between the image density of each of the multiple patches and the image density value of 20% in the non-streak portion. A coordinate on the vertical axis in the "PATCH" in FIG. 10 is the brightness difference between brightness values of the patch printed by the FM screening and the patch having the image density of the non-streak portion.

The values of the image density difference and the brightness difference are the values from 0 to 255, when they are expressed in 256 gradations, respectively. As described above, the image density value indicates the image density of the pixel determined by the image data. For example, when the pixel values are configured by 8 bits, the image density value of the brightest image density is "0" and the image density value of the darkest image density is "255". The brightness value indicates the brightness read by the reading unit 104. For example, in this embodiment, the brightness value of the darkest image density is "0" and the brightness value of the brightest image density is "255". Therefore, as illustrated in the graph of FIG. 10, the positive and negative signs are reversed between the image density difference and the brightness difference.

The experimental results in FIG. 10 include brightness difference in cases where the image density difference is −20, −10, −5, 0, 5, and 10. When the image density difference is −5, the brightness differences of narrow vertical streaks of 42 μm, 84 μm, and 168 μm are zero. This is because brightness peak value cannot be discriminated, and the vertical streak cannot be detected. As the absolute value of the brightness difference increases with respect to the absolute value of the image density difference, the reading sensitivity of the reading unit 104 is higher. Therefore, as the absolute value of the slope of the graph is larger, the sensitivity is higher. That is, the absolute value of the slope of the graph indicates the sensitivity itself.

In FIG. 10, the absolute value of the slope of the graph corresponding to "PATCH" is greater than that of the graph corresponding to the thinnest streak of 42 μm. In addition, the sensitivities of the vertical streak of 42 μm and the vertical streak of 84 μm are almost the same. Additionally, the sensitivity of vertical streak of 168 μm is higher than the sensitivities of vertical streaks of 42 μm and 84 μm. Furthermore, the sensitivity of vertical streak of 672 μm is higher than the sensitivity of vertical streak of 168 μm, but their difference is small.

The above results indicate that the brightness difference by the reading unit 104 (that is, the scanner 503) between the streak and the non-streak portion becomes small when the image output unit 103 forms the image from image data including the vertical streak and the image density value expressed by 8 bits (that is, multivalue data) by using the screening that is the binary image processing, the four value image processing, or the like, because the original image including the image density value expressed by 8 bits data loses image information in the image after the above image formation. As a result, the brightness difference between the streak and the non-streak portion read by the reading unit 104 (that is, the scanner 503) becomes small. The influence of losing image information described above is larger in the thin vertical streak than in the thick vertical streak, and the brightness difference in the thin vertical streak becomes smaller than the brightness difference in the thick vertical streak. That is, the sensitivity of a thin vertical streak is lower than the sensitivity of the thick vertical streak.

Further, in the FM screen used in the experiment, the sensitivity of the thin vertical streak of less than 100 μm drastically decreases, but the sensitivity of the vertical streak of 100 μm or more gradually increases as the streak width increases. FIG. 11 illustrates a graph in which the horizontal axis indicates the streak width and the vertical axis is the absolute value of the sensitivity obtained from FIG. 10, which is expressed as "SENSITIVITY Y" in FIG. 11. The streak width is expressed by using x when the streak width is expressed by the following formula.

$$\text{Streak width} = 42\ \mu m \times 2^x$$

As described above, the curve of FIG. 11 includes a sharp sensitivity change in a thin vertical streak and a gentle sensitivity change in a thick vertical streak. Therefore, for calculation of the approximate expression in the approximate curve, a logarithmic approximation may be used. Alternatively, as illustrated in FIG. 11, a quadratic function may be used to calculate the approximate expression. When obtaining the sensitivity of the streak width of the vertical streak, the measurement may be performed on the selected streak width increased in accordance with the exponential function. In the streak detection chart described later, the patch may have the streak having the selected streak width increased in accordance with the exponential function. In FIG. 11, the value of "9" at the right end of the graph means a patch size that is 42 μm×$2^9$=21.504 mm.

FIG. 12 is a table of sensitivity ratio that is a ratio of the sensitivity in each streak width to the sensitivity of the patch when the sensitivity of the patch is calculated as 1.13 that is an absolute value of the slope calculated based on the "PATCH" in the graph illustrated in FIG. 10. Data in FIG. 12 indicates a large change of the sensitivity ratio in the streak width of less than 300 μm, a gentle change of the sensitivity ratio in the streak width of 300 μm or more, and a substantially constant value of the sensitivity ratio in the streak width of 2000 μm or more.

Correction coefficient is described below.

A correction coefficient to eliminate the vertical streak read by the reading unit 104 in different reading sensitivity that depends on the streak width is described.

Figure 13:
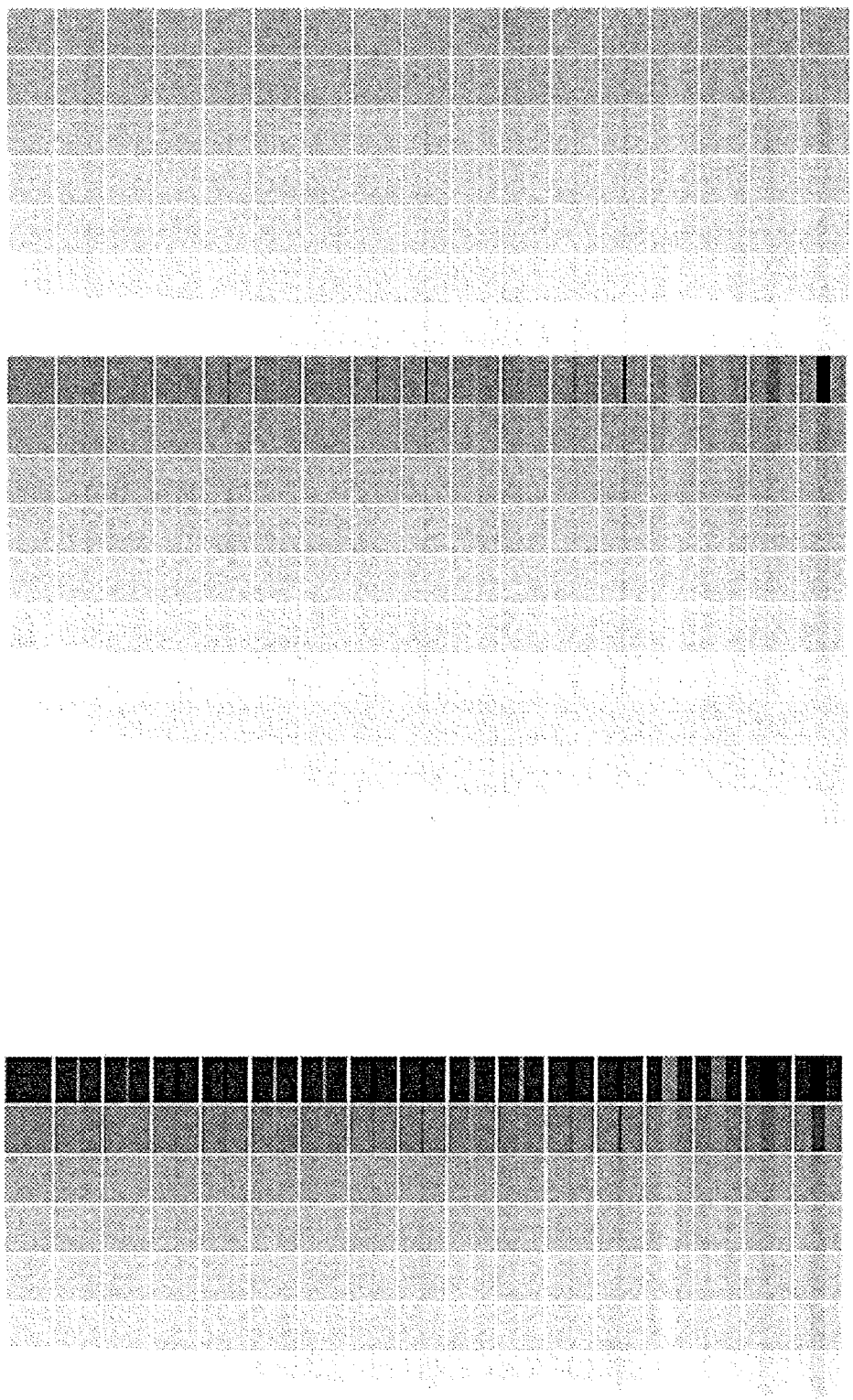
FIG. 13 is a diagram illustrating an example of a streak detection chart including vertical streaks.
Figure 14:
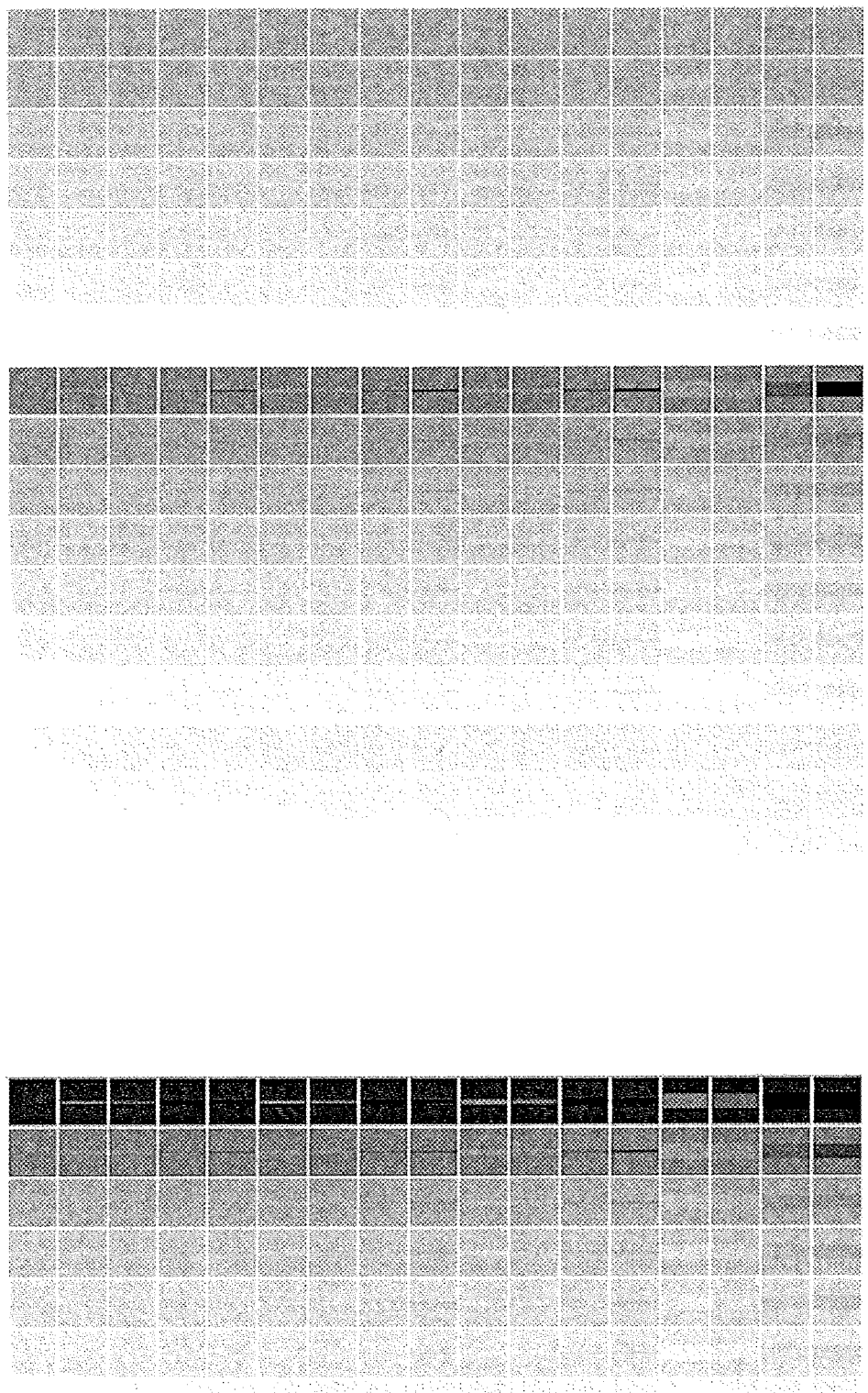
FIG. 14 is a diagram illustrating an example of a streak detection chart including horizontal streaks.
Figure 15:
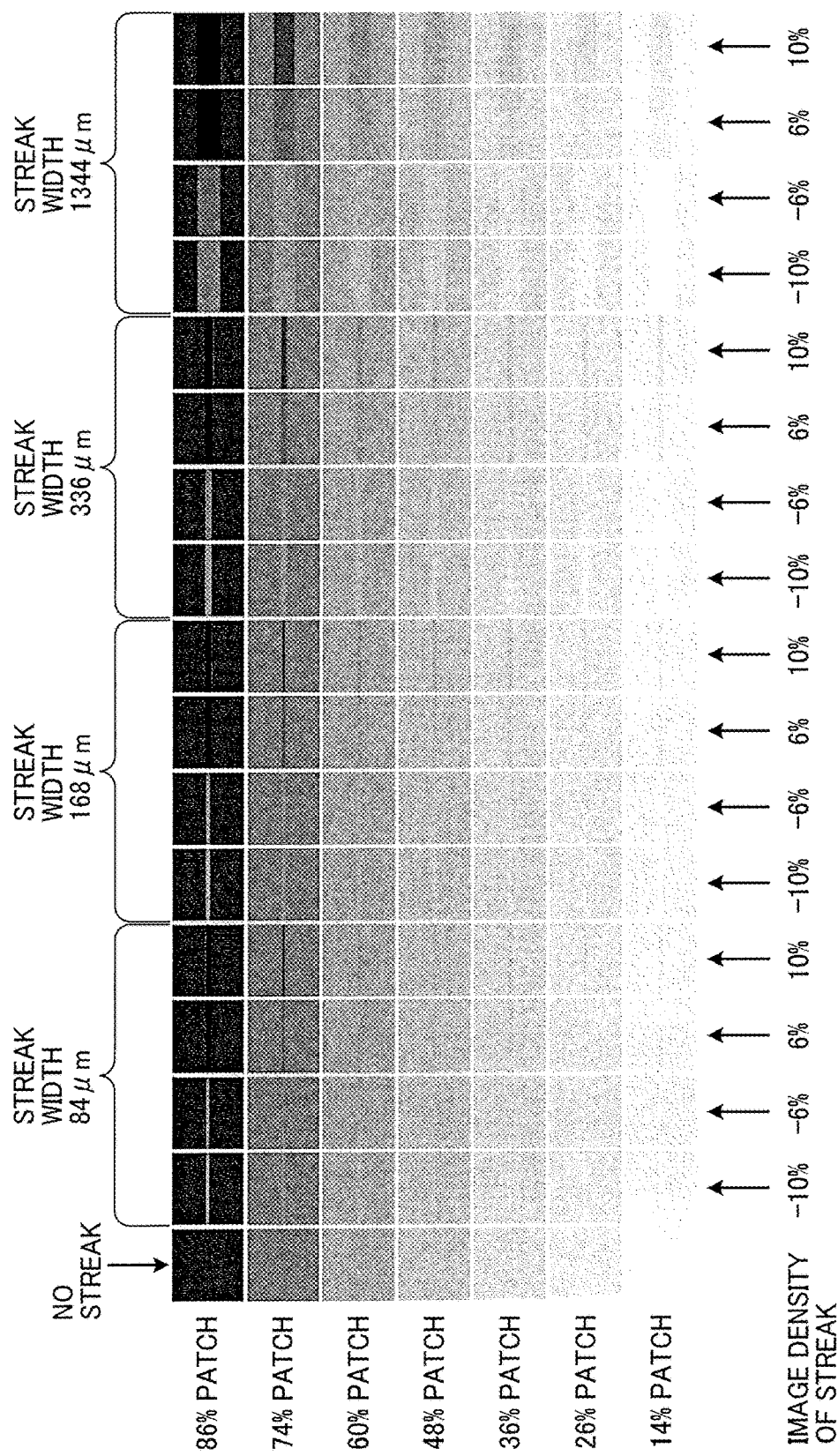
FIG. 15 is a diagram illustrating a black chart extracted from the streak detection chart including horizontal streaks.

FIG. 13 is a diagram illustrating an example of a streak detection chart including vertical streaks. FIG. 14 is a diagram illustrating an example of a streak detection chart including horizontal streaks. FIG. 15 is a diagram illustrating a black chart extracted from the streak detection chart including horizontal streaks. The streak detection chart to calculate the correction coefficient used in the MFP 1 according to the present embodiment is described with reference to FIGS. 13 to 15.

FIG. 13 illustrates an output image in which the image output unit 103 prints patches on the recording medium using the screening based on image data of the patches, including the vertical streaks, arranged for each color of cyan, magenta, yellow, and black. FIG. 14 illustrates an output image in which the image output unit 103 prints patches on the recording medium using the screening based on image data of the patches, including the horizontal streaks, arranged for each color of cyan, magenta, yellow, and black. An outputted chart including patches of each color of cyan magenta, yellow, and black that are arranged and printed on the recording medium is called the streak detection chart, which is illustrated in FIGS. 13 and 14. FIG. 15 is a diagram illustrating black patches extracted from cyan, magenta, yellow, and black patches in the streak detection chart illustrated in FIG. 14. The following description is based on a chart in FIG. 15 in which the black patches are arranged. The chart illustrated in FIG. 15 is also called the streak detection chart.

In the streak detection chart illustrated in FIG. 15, the seven patches arranged in the vertical direction include selected seven densities 86%, 74%, 60%, 48%, 36%, 26%, and 14% in order from top in FIG. 15, respectively, in the non-streak portion of each patches. As illustrated in FIG. 15, patches arranged in the horizontal direction include patches not having the streak and patches with streak widths of 84 μm, 168 μm, 336 μm, and 1344 μm, respectively. Patches with streak widths of 84 μm, 168 μm, 336 μm, and 1344 μm each have four patches in which the image density differences between the streak and the non-streak portion are −10%, −6%, 6%, and 10%. Patches corresponding to cyan, magenta, yellow, and black have similar configurations in the streak detection chart. The arrangement of patches illustrated in FIG. 15 is an example. Different image density of the non-streak portion of the patches arranged in the vertical direction may be selected. Patches having different streak widths or different streak densities in the horizontal direction may be arranged.

Next, a specific method of calculating the correction coefficient to eliminate the vertical streak is described.

Figure 16A:
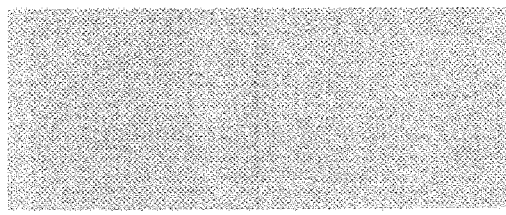
FIG. 16A is a diagram illustrating halftone image including a streak whose width is 84 μm.
Figure 16B:
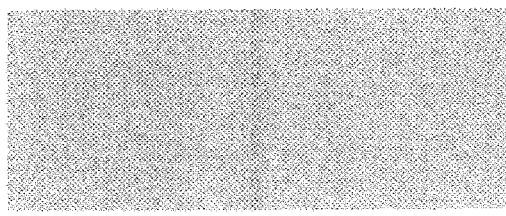
FIG. 16B is a diagram illustrating halftone image including a streak whose width is 336 μm, which has a same image density as the image of FIG. 16A.
Figure 16C:
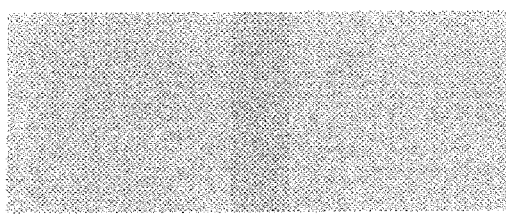
FIG. 16C is a diagram illustrating halftone image including a streak whose width is 2688 μm, which has the same image density as the image of FIG. 16A.
Figure 17A:
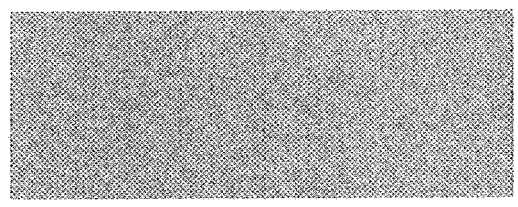
FIG. 17A is a diagram illustrating an image obtained by printing image data of FIG. 16A and reading the printed image.
Figure 17B:
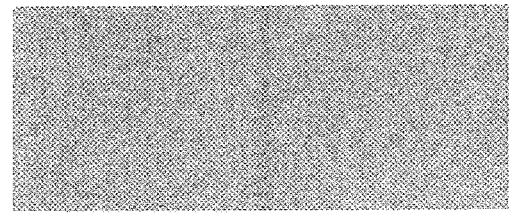
FIG. 17B is a diagram illustrating an image obtained by printing image data of FIG. 16B and reading the printed image.
Figure 17C:
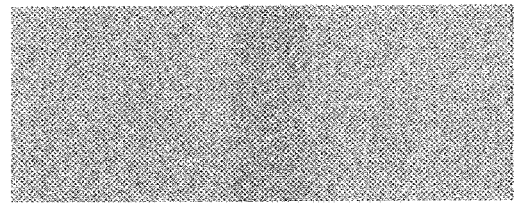
FIG. 17C is a diagram illustrating an image obtained by printing image data of FIG. 16C and reading the printed image.
Figure 18:
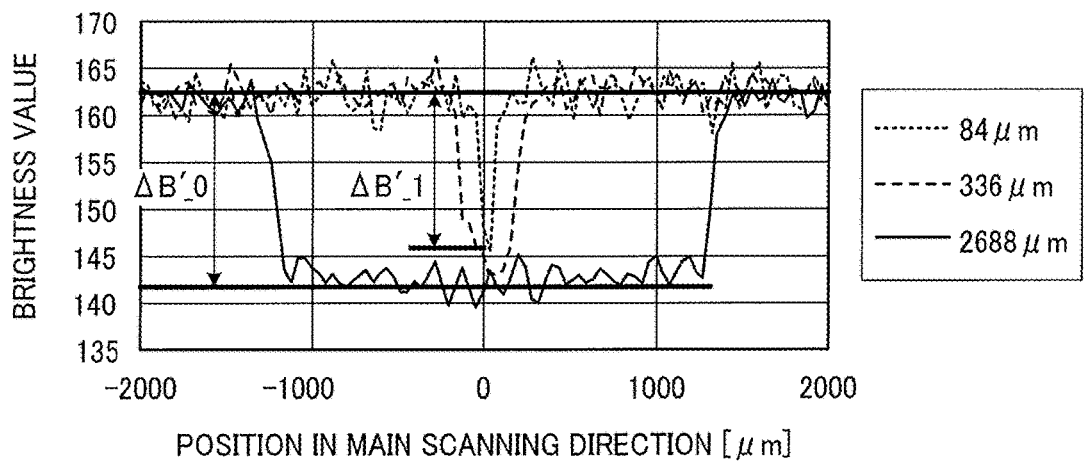
FIG. 18 is a graph illustrating an example of a relationship between a position in the main scanning direction and a brightness value detected.

FIGS. 16A, 16B, and 16C are diagrams illustrating halftone images including streaks each having different width but same image density. FIGS. 17A, 17B, and 17C are diagrams illustrating images obtained by printing image data of FIGS. 16A, 16B, and 16C and reading each of the printed images, respectively. FIG. 18 is a graph illustrating an example of a relationship between a position in the main scanning direction and a detected brightness difference. With reference to FIGS. 16 to 18, a specific method of calculating the correction coefficient to eliminate the vertical streak is described.

FIG. 16 illustrates halftone images that are patches based on image data including vertical streaks of different widths with the same image density difference. FIG. 16A illustrates the patch with the streak width of 84 μm. FIG. 16B illustrates the patch with the streak width of 336 μm. FIG. 16C illustrates the patch with the streak width of 2688 μm. In the examples of FIG. 16, the image density value of the every streak is higher than the image density value of the non-streak portion. Any of the streak detection charts illustrated in FIGS. 13 to 15 may include image data of the images, which are patches, illustrated in FIGS. 16A to 16C printed on the recording medium. FIG. 17 is the image read by the reading unit 104 on each of the patches illustrated in FIG. 16 that are printed on the recording medium by screening. In the image illustrated in FIG. 17, the image in FIG. 17A corresponds to the patch in FIG. 16A, the image in FIG. 17B corresponds to the patch in FIG. 16B, and the image in FIG. 17C corresponds to the patch in FIG. 16C. The image density of each patch illustrated in FIG. 16 is the same, but as illustrated in FIG. 17, the thinner vertical streaks are blurred in FIG. 17. As described above, this is because the sensitivity of the thin vertical streak is lower than the sensitivity of the thick vertical streak, that is, the brightness difference in the thin vertical streak is smaller than the brightness difference in the thick vertical streak.

FIG. 18 is a graph illustrating results in which the reading unit 104 reads the image having some different streak widths illustrated in FIG. 17. In FIG. 18, the horizontal axis is the position in the main scanning direction and the vertical axis is the brightness value. The main scanning direction is a direction orthogonal to the feeding direction of the recording medium that is also called the sub-scanning direction. As illustrated in FIG. 18, the brightness difference $\Delta B'\_0$ between the brightness value of the non-streak portion and the brightness value of the streak that is an example of a second streak having the largest streak width 2688 μm as an example of a second streak width is larger than the brightness difference $\Delta B'\_1$ between the brightness value of the non-streak portion and the brightness value of the streak that is an example of a first streak having the thinner streak width 84 μm as an example of a first streak width having the thinner streak width than the second streak width. This is because, as described above, the sensitivity of the thin vertical streak is lower than the sensitivity of the thick vertical streak. The brightness difference is determined based on data of graph in FIG. 18. For example, the brightness value of the streak may be an average of brightness values in the streak in FIG. 18, and the brightness value of the non-streak portion may be an average of brightness values in the non-streak portion in FIG. 18. The difference between the brightness value of the non-streak portion and the brightness value of the streak becomes the difference between these average values. As described above, the sensitivity change in the thin vertical streak is steep, but the sensitivity change in the thick vertical streak is gentle, and the sensitivity of the thick vertical streak is high. Therefore, when the streak width is sufficiently large, for example, 2688 μm, the calculated brightness difference $\Delta B'\_0$ may be regarded as a true brightness difference. On the other hand, when the streak width is small, for example, 84 μm, since the sensitivity is low, the calculated brightness difference is smaller than the true brightness difference. Therefore, in a vertical streak having the small streak width, for example, 84 [μm], the correction coefficient calculated by the following equation (1) is obtained.

$$\text{(Correction coefficient corresponding to the small streak width, for example 84 μm)} = \Delta B'\_0/\Delta B'\_1 \quad (1)$$

An image density value is corrected by multiplying the image density value at the streak in the patch illustrated in FIG. 16A by the correction coefficient calculated by the above equation (1). As is apparent from FIG. 18 and the above-described equation (1), the correction coefficient calculated by the equation (1) is larger than one. Similarly, the correction coefficient corresponding to the vertical streak with the streak width of 336 μm is calculated by dividing the brightness difference $\Delta B'\_0$ by the difference between the brightness value in the non-streak portion in the graph illustrated in FIG. 18 and the brightness value in the streak corresponding to the streak width of 336 μm in the graph illustrated in FIG. 18.

The correction coefficient calculated by the above method is stored in the storage unit 107 as correction information corresponding to each streak width. As described above, the reproducibility of the vertical streaks depends on the type of screening, that is, whether it is the AM screen or FM screen, and the number of lines and the screen angle in the AM screen etc. Even if the image data includes the same image density difference and the same streak width, the sensitivity varies if the screening type is different. Therefore, it is preferable that the correction coefficient be calculated for each type of screening. In this case, the storage unit 107 stores the correction information in which correction coefficients are associated with each streak width and for each type of screening.

The detection unit 105 obtains the streak width as follows. The detection unit 105 may calculate the streak width based on a result of reading the streak detection chart including the vertical streaks or the horizontal streaks in FIGS. 14 and 15. The storage unit 107 may store the correction information associating the correction coefficient with the streak width. In the streak detection chart, since the streak width is known as described above with reference to FIG. 15, this known streak width may be used. In this case, the storage unit 107 may store the correction information associating the correction coefficient with the known streak width. When the detection unit 105 detects the streak width based on the read data, the detection unit 105 may calculate the half width as the streak width. For example, in FIG. 18, the detection unit 105 may calculate the half-value width based on the half value of the brightness value at a falling portion from the non-streak portion to the streak and a rising portion from the streak to the non-streak portion. The detection unit 105 may use a predetermined threshold value to calculate the streak width. The detection unit 105 may determine the width from the position in the main scanning direction that exceeds the predetermined threshold at the falling portion to the position in the main scanning direction that lowers the predetermined threshold at the rising portion as the streak width. In addition, other methods that can detect an appropriate streak width may be selected.

Use of the correction information including the correction coefficient corresponding to each screening type and each streak width enables to eliminate the vertical streak occurred in the image printed on the recording medium. That is, the correction of the image density value of the image data corresponding to the vertical streak in the printed image eliminates the vertical streak. Processing of correcting the vertical streak using the correction information is described later with reference to FIG. 20.

As described above, the streak detection chart illustrated in FIG. 13 includes patches having vertical streaks, and the streak detection chart illustrated in FIG. 14 includes patches having horizontal streaks. An advantage of the streak detection chart illustrated in FIG. 14 is that it is easy to remove influence of the vertical streak caused by factors of the MFP 1 from detected data because the horizontal streak is originally in the streak detection chart and has different direction from the vertical streak to be corrected.

The FM screen that does not have the screen angle has the same reading sensitivity for the streaks in any direction. Therefore, for example, the direction of the streak in the image data of the streak detection chart is preferably a direction rotated by 90 degrees with respect to the direction of the vertical streak to be corrected. That is, it is preferable that the streak in the image data of the streak detection chart is the horizontal streak. However, the direction of the streak in the image data of the streak detection chart is not limited to 90 degrees with respect to the vertical streak but may be a direction different from the direction of the vertical streak. This has the effect of facilitating separation of the influence of vertical streaks caused by factors of the MFP 1 from the detection result of the original streak in the streak detection chart.

In the AM screen having the screen angle, the growth of dots may be different depending on the direction. However, the AM screen illustrated in FIGS. 4 and 5 has a screen angle of 45 degrees, and even when rotated 90 degrees, the dot growth becomes the same. Therefore, the use of the image data of the streak detection chart having the streaks in the direction satisfying the following formula (2) has, similar to the above description, the effect of facilitating separation of the influence of vertical streaks caused by factors of the MFP 1 from the detection result of the original streak in the streak detection chart.

(Difference between correcting direction and screen angle)=(difference between streak direction of the chart and screen angle) (2)

Figure 19:
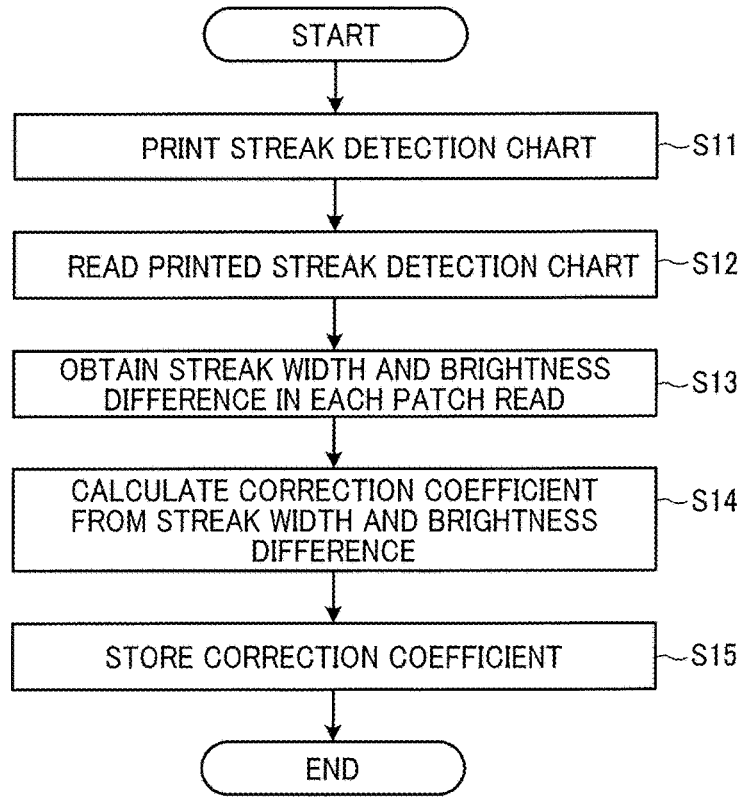
FIG. 19 is a flowchart illustrating an example of a process to obtain a correction coefficient in the image forming apparatus according to the first embodiment.

A calculation process flow of the correction coefficient is described below. FIG. 19 is a flowchart illustrating an example of a process to obtain a correction coefficient in the image forming apparatus according to the first embodiment. The calculation process flow of the correction coefficient of the MFP 1 according to the present embodiment is described below with reference to FIG. 19.

In step S11, the image output unit 103 processes the image data of the streak detection chart of FIG. 13, FIG. 14 or the like stored in the storage unit 107 in accordance with the operation input of the operation unit 109 by the user (or an administrator, a maintenance person) by using the predetermined screening, and forms and outputs the streak detection chart on the recording medium. Then, the process proceeds to step S12.

In step S12, the reading unit 104 reads the streak detection chart that is formed and printed by the image output unit 103. Specifically, the reading unit 104 reads the brightness values of the streak and the non-streak portion in each patch of the streak detection chart. Then, the process proceeds to step S13.

In step S13, based on brightness values read by the reading unit 104, the detection unit 105 calculates the brightness difference between the brightness value of the non-streak portion and the brightness value of the streak in each patch and the streak width in each patch. The calculation method of the brightness difference and the streak width is described above. Then, the process proceeds to step S14.

In step S14, the calculation unit 106 obtains the brightness difference between the brightness value of the non-streak portion in each of patches having the same image density difference and different streak widths, as illustrated in FIG. 16 described above, selects the brightness difference corresponding to a patch having the largest streak width, and calculates the correction coefficient corresponding to the streak width in which the correction coefficient is set by dividing the brightness difference corresponding to the patch having the largest streak width by the brightness difference corresponding to the streak width in which the correction coefficient is set (see the equation (1)). Then, the process proceeds to step S15.

In step S15, the calculation unit 106 leads the storage unit 107 to store the calculated correction coefficient as correction information corresponding to each streak width. As described above, since the type of screening changes the reproducibility of the vertical streak and the sensitivity even in the image data having the same image density difference and the same streak width, preferably, the storage unit 107 stores the correction coefficient corresponding to not only the streak width but also the type of screening as the correction information.

The above described flow of steps S11 to S15 is execution of the calculation process of the correction coefficient in the MFP 1 according to the present embodiment.

Flow of correction process is described below.

Figure 20:
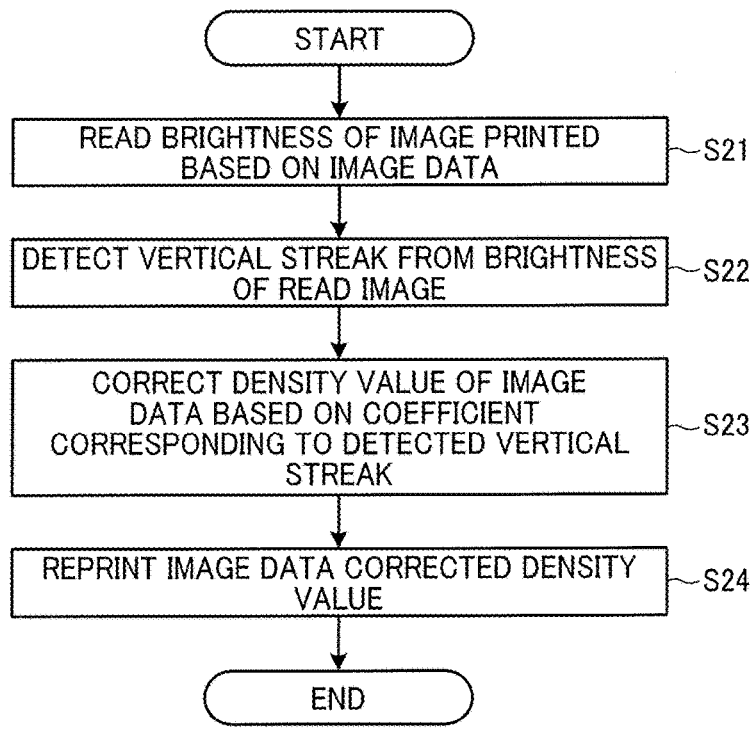
FIG. 20 is a flowchart illustrating an example of a correction process performed by the image forming apparatus according to the first embodiment.

FIG. 20 is a flowchart illustrating an example of a correction process performed by the image forming apparatus according to the first embodiment. The correction process flow of the MFP 1 according to the present embodiment is described below with reference to FIG. 20.

In step S21, the reading unit 104 reads the brightness of the image on the recording medium on which the image of the image data is formed and printed. Then, the process proceeds to step S22.

In step S22, detection unit 105 detects whether the vertical streak exists based on the brightness read by the reading unit 104. Specifically, the detection unit 105 focuses on change in brightness value in the main scanning direction of the image on the recording medium, and, for example, the detection unit 105 may determine the streak exists when the brightness value falls below a predetermined threshold value and, after that, exceeds a predetermined value, or, when the brightness value exceeds a predetermined threshold value and, after that, falls below a predetermined value. The method of determining the existence of the vertical streak is not limited to the above-described method.

Further, when the detection unit 105 detects the vertical streak, the detection unit 105 calculates the streak width of the vertical streak. The calculation method of the streak width is the same as described above with reference to FIG. 18. Then, the process proceeds to step S23.

In step S23, the correction unit 108 reads the correction information corresponding to the streak width calculated by the detection unit 105 from the storage unit 107. Next, the correction unit 108 corrects the image density value by multiplying the image density value corresponding to the vertical streak detected by the detection unit 105 by the correction coefficient included in the read correction information. Specifically, the correction unit 108 replaces the original image density value with a value obtained by multiplying the original image density value by the correction coefficient. Then, the process proceeds to step S24.

In step S24, the image output unit 103 reprints the image data whose image density value is corrected on the recording medium according to the operation input of the operation unit 109 by the user (or the administrator, the maintenance person, etc.). As a result, the vertical streak is corrected, and the image data is printed out on the recording medium.

Through the flow of steps S21 to S24, the correction process of the MFP 1 according to the present embodiment is executed.

When the occurrence of the vertical streak is known at a predetermined position in the main scanning direction on the recording medium printed the image based on the image data, the storage unit 107 may store a position of the vertical streak detected by the detection unit 105 in the main scanning direction and the streak width corresponding to the position. This makes it unnecessary for the reading unit 104 to read the vertical streak printed on the recording medium at every time when the vertical streak occurs, and enables correction unit 108 to correct the image density value of the image data for printing at the position in the main scanning direction in which the storage unit 107 stores occurrence of the vertical streak in advance by the correction coefficient corresponding to the streak width of the vertical streak directly.

As described above, because the reading sensitivity of the thin vertical streak is lower than the reading sensitivity of the thick vertical streak, the brightness difference in the thin vertical streak is smaller than the brightness difference of the thick vertical streak, and the streak having the sufficient streak width can be regarded as the true brightness difference, the value calculated by the equation (1) gives the correction coefficient. Correcting the image density value of the image data corresponding to the vertical streak based on the correction coefficient corresponding to the streak width of the vertical streak printed on the recording medium enables to correct and delete the vertical streak.

Second Embodiment

An image forming apparatus according to the second embodiment is described focusing on differences from the image forming apparatus (MFP 1) according to the first embodiment.

In the first embodiment, the vertical streak correction in the MFP 1 as the image forming apparatus is described. In the present embodiment, the vertical streak correction in an inkjet printer employing a line head as the image forming apparatus is described. The contents of the functional block configuration, the calculation process of the correction coefficient, and the correction process in the image forming apparatus according to the present embodiment are the same as those of the image forming apparatus according to the first embodiment.

Structure of the image forming apparatus is described below.

Figure 21:
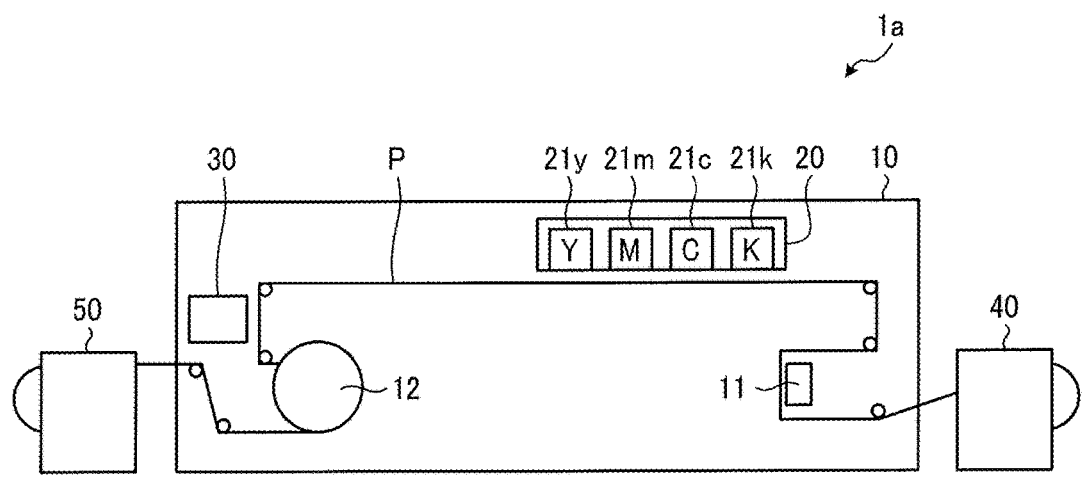
FIG. 21 is a schematic cross-sectional view illustrating an example of a structure of an image forming apparatus (an inkjet printer) according to a second embodiment.
Figure 22:
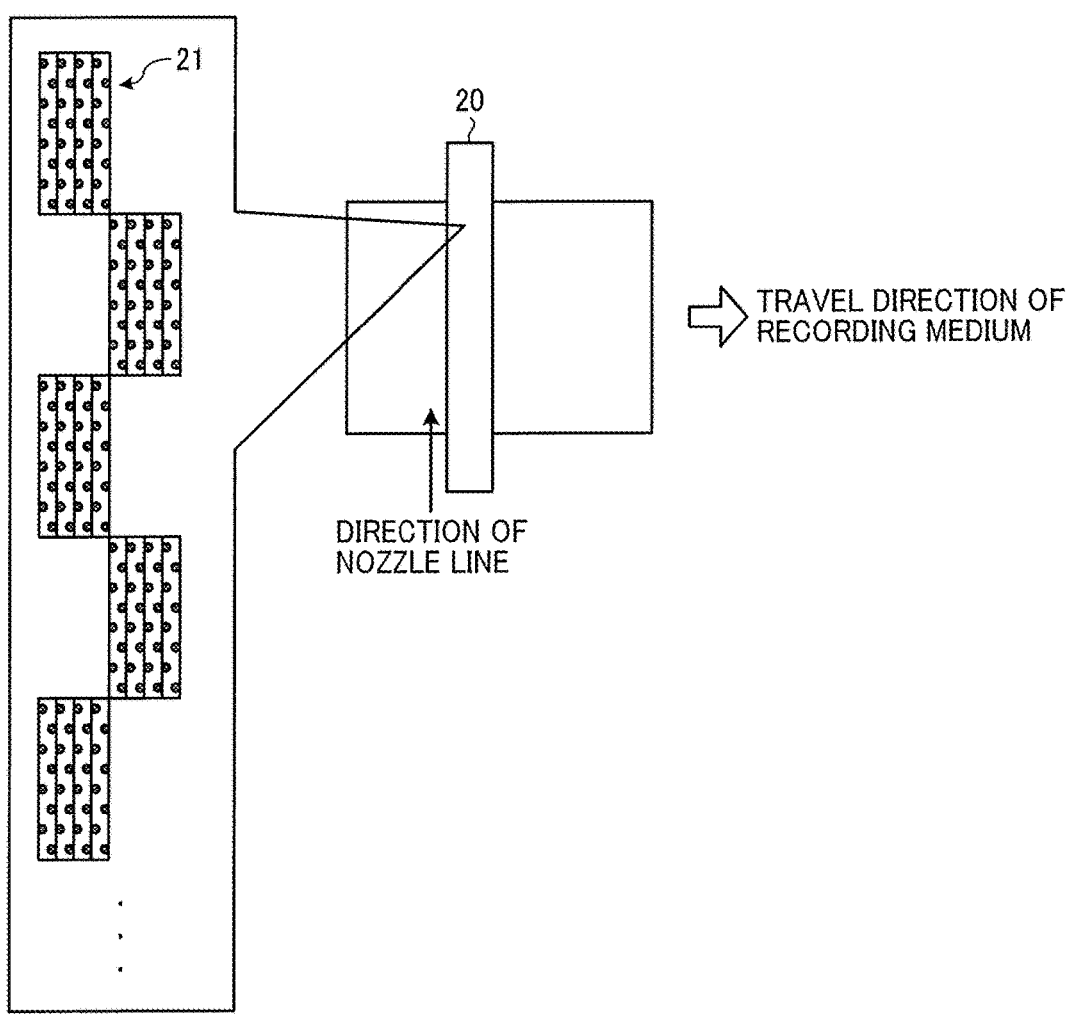
FIG. 22 is an explanatory diagram of a line head of the image forming apparatus according to the second embodiment.
Figure 23:
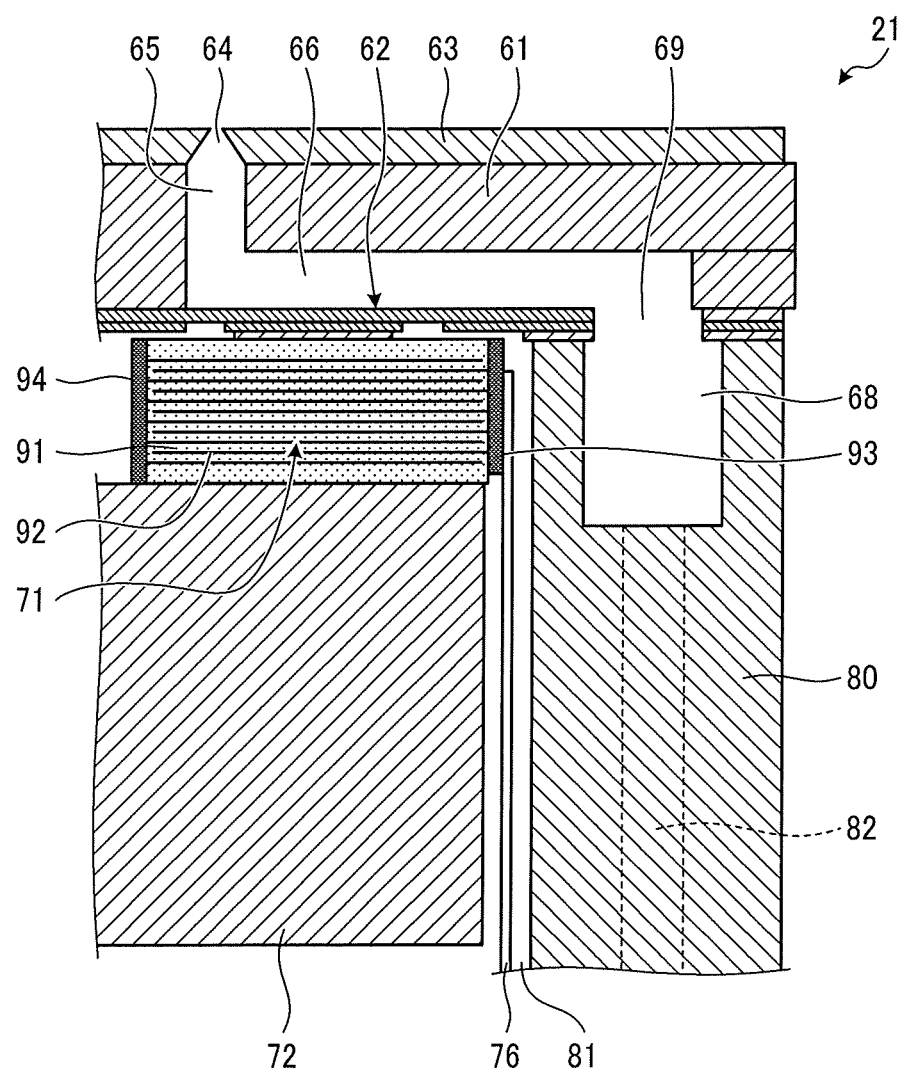
FIG. 23 is a cross-sectional view of a liquid chamber of a print head of the image forming apparatus according to the second embodiment along a longitudinal direction of the liquid chamber.
Figure 24:
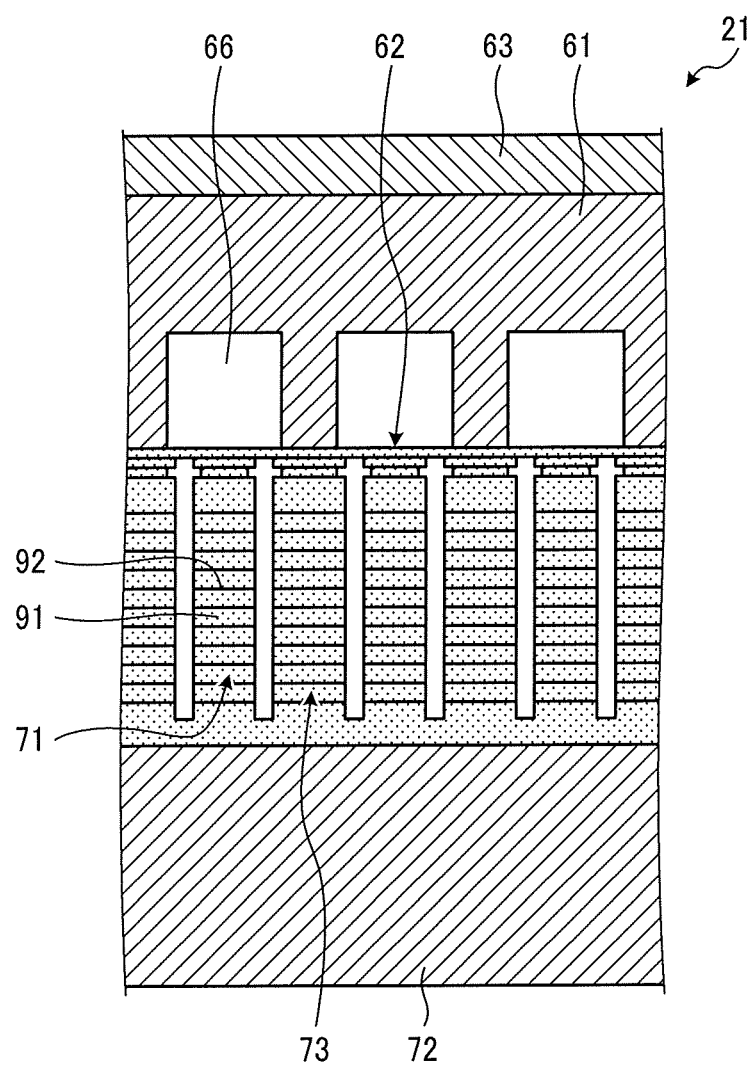
FIG. 24 is a cross-sectional view of the liquid chamber of the print head of the image forming apparatus according to the second embodiment along a traverse direction of the liquid chamber.

FIG. 21 is a schematic cross-sectional view illustrating an example of a structure of the image forming apparatus (the inkjet printer) according to the second embodiment. FIG. 22 is an explanatory diagram of the line head of the image forming apparatus according to the second embodiment. FIG. 23 is a cross-sectional view of a liquid chamber of a print head of the image forming apparatus according to the second embodiment along a longitudinal direction of the liquid chamber. FIG. 24 is a cross-sectional view of the liquid chamber of the print head of the image forming apparatus according to the second embodiment along a traverse direction of the liquid chamber. The structure of the image forming apparatus according to the present embodiment is described with reference to FIGS. 21 to 24.

As illustrated in FIG. 21, the inkjet printer 1a that is an example of the image forming apparatus according to the present embodiment is a line head type and includes a main body 10, a sheet-feeding device 40, and a sheet-discharging device 50.

The main body 10 is a main body of the image forming apparatus that prints out on the recording medium by a line head method. The sheet-feeding device 40 feeds the recording medium P. A plurality of guide rollers conveys the recording medium P. The main body 10 includes an edge controller 11, a heat controller 12, a print head unit 20, and a scanner 30.

The edge controller 11 regulates positions of both ends in the width direction of the fed recording medium P, corrects the deviation of the recording medium P in a direction orthogonal to the conveying direction of the recording medium P, and prevents meandering of the recording medium P.

The print head unit 20 is a unit of the line head type and sprays a liquid droplet onto the recording medium P that is conveyed to a predetermined position to form an image. The print head unit 20 includes print heads 21$k$, 21$c$, 21$m$, and 21$y$ provided along the recording medium P to spray the liquid droplet of each color of black, cyan, magenta, and yellow, respectively. When an arbitrary print head or all print heads are referred, the print heads 21k, 21c, 21m and 21y are simply referred to as "the print head 21" or "the print heads 21".

The scanner 30 is a device to read the image formed on the recording medium P optically. The scanner 30 includes, for example, the line sensor and the like. As the configuration of the scanner 30, various known scanner configurations can be used.

The heat controller 12 is a drum-shaped heater device disposed on the downstream side of the print head unit 20. The heat controller 12 heats the recording medium P in which the image is formed to dry and fix the droplets of each color landed on the recording medium P from the print head unit 20.

The sheet-feeding device 40 is a device to feed the recording medium such as paper to the main body 10. The sheet-discharging device 50 is a device to take up the recording medium P after the image is formed. Further, a post-processing device may perform various post-treatments such as cutting, winding, binding, and the like.

As illustrated in FIG. 22, since most of the print head units 20 of the line head type are elongated heads connecting a plurality of print heads 21 in a direction of nozzle line that is perpendicular to a travel direction of the recording medium, the print head unit 20 has a problem of seam lines, which is a problem inherent in the inkjet printer of the line head type.

Next, the structure of the print head 21 including the print head unit 20 is described with reference to FIGS. 23 and 24. The print head 21 that is a liquid spray head includes a liquid conduit plate 61 formed by anisotropic etching of a single crystal silicon substrate, for example, a vibration plate 62 formed by nickel electrocasting, for example, and bonded to the lower surface of the liquid conduit plate 61, and a nozzle plate 63 bonded to the upper surface of the liquid conduit plate 61. In the print head 21, a nozzle communication conduit 65 communicating with a nozzle 64 that sprays liquid droplets (i.e., ink droplets) by the liquid conduit plate 61, the vibration plate 62, and the nozzle plate 63, a liquid chamber 66 serving as a pressure-generating chamber are formed. Further, an ink supply port 69 communicating with a common liquid chamber 68 that supplies ink to the liquid chamber 66 is also formed. The print head 21 further includes a layered piezoelectric element 71 and a base substrate 72 on which the piezoelectric element 71 is fixedly bonded. The piezoelectric element 71 has two lines, and serves as an electricity-to-mechanical-force converting element that is a pressure-generating unit to apply a pressure to the ink inside the liquid chamber 66 by deforming the vibration plate 62. The piezoelectric element 71 is connected to a drive circuit by a Flexible Printed Circuit (FPC) cable 76.

Further, in the print head 21, pillar portions 73 are disposed between the piezoelectric elements 71. The pillar portions 73 are formed together with the piezoelectric elements 71 by dividing a piezoelectric element member, and simply serve as supporting pillars since no drive voltage is applied thereto.

A frame member 80 is bonded to the peripheral portion of the vibration plate 62. The frame member 80 has a through-hole portion 81, a recess serving as the common liquid chamber 68, and an ink supply hole 82 to supply ink from an external source to the common liquid chamber 68. The through-hole portion 81 accommodates an actuator unit including the piezoelectric element 71 and the base substrate 72. The frame member 80 is made of a thermo-setting resin such as an epoxy-type resin or polyphenylene sulfide formed by injection molding.

In the liquid conduit plate 61, the nozzle communication conduit 65 and the liquid chamber 66 are formed by anisotropic etching of a single crystal silicon substrate having a crystal orientation of (110), for example, by use of an alkali etching solution such as a potassium hydrate aqueous solution (KOH). However, the material is not limited to a single crystal silicon substrate. Another material such as a stainless substrate or photosensitive resin may be used.

The vibration plate 62 is made of a nickel metal plate, which may be produced by electroforming (i.e., electrocasting). Alternatively, a plate made of another metal or a member comprised of a metal and a resin plate bonded together may be used. The piezoelectric elements 71 and the pillar portions 73 are bonded by an adhesive to the vibration plate 62, to which the frame member 80 is also bonded by an adhesive.

The nozzle plate 63 has a nozzle 64 with a diameter of 10 to 30 micrometers at the position of each liquid chamber 66, and is bonded by an adhesive to the liquid conduit plate 61. The nozzle plate 63 is configured such that a water repellant layer is formed as an outermost layer over the surface of a nozzle-formed member made of metal, with an intervening layer.

The piezoelectric element 71 is a laminated piezoelectric element (e.g., piezoelectric zirconate titanate (PZT)) in which a piezoelectric material 91 and an internal electrode 92 are alternately laminated. The inner electrodes 92 of the piezoelectric element 71 are alternately exposed on the opposite side faces for electrical coupling to an individual electrode 93 and a common electrode 94. In the present embodiment, ink inside the liquid chamber 66 is pressurized by use of a displacement in a d33 direction as a piezoelectric direction of the piezoelectric element 71. Alternatively, a displacement in a d31 direction as a piezoelectric direction of the piezoelectric element 71 may be used to apply a pressure to the ink inside the liquid chamber 66. Further, a line of piezoelectric elements 71 may be provided on a single base substrate 72.

In the print head 21 having the configuration as described above, a voltage applied to the piezoelectric element 71 may be lowered from a reference potential to cause the piezoelectric element 71 to contract, thereby lowering the vibration plate 62 to expand the volume of the liquid chamber 66. In response, ink flows into the liquid chamber 66. The voltage applied to the piezoelectric element 71 is then raised to cause the piezoelectric element 71 to expand in a direction perpendicular to its layers, which causes the vibration plate 62 to shift toward the nozzle 64, thereby reducing the volume of the liquid chamber 66. This pressurizes the print liquid inside the liquid chamber 66, so that a droplet of the print liquid is sprayed (i.e., ejected) from the nozzle 64. The voltage applied to the piezoelectric element 71 is then returned to the reference potential to restore the vibration plate 62 to its original position, which causes the liquid chamber 66 to expand to generate a negative pressure. Along with this movement, print liquid is replenished in the liquid chamber 66 from the common liquid chamber 68. An operation to spray a next droplet is commenced after the vibration of the meniscus face of the nozzle 64 sufficiently attenuates. The method to drive the print head is not limited to the example described above in which pulling comes before a pushing ejection. A drive waveform may be changed to perform a pulling ejection or a pushing ejection.

A hardware configuration of the image forming apparatus according to the second embodiment is described below.

Figure 25:
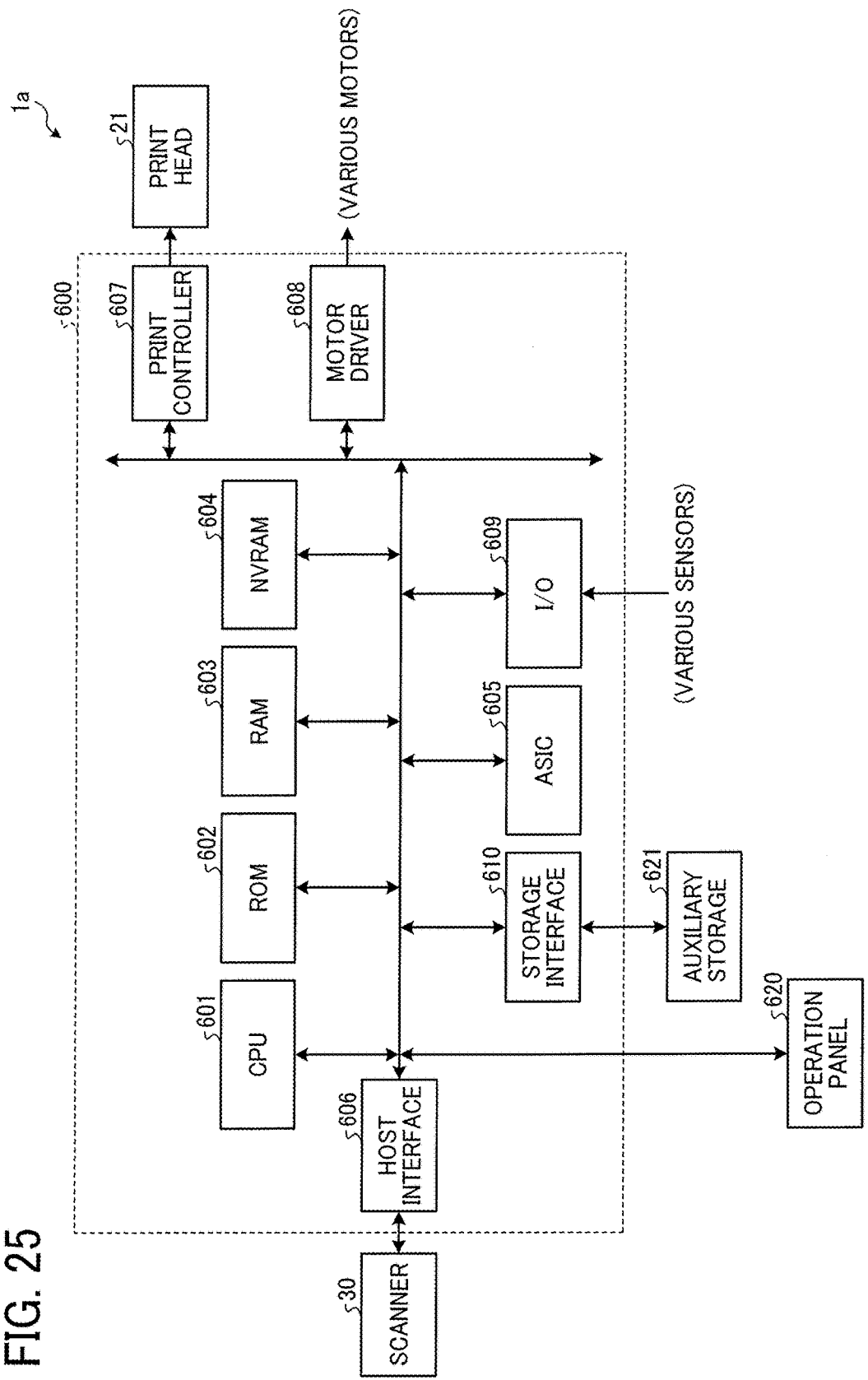
FIG. 25 is a block diagram illustrating an example of a hardware configuration of an image forming apparatus according to the second embodiment.

FIG. 25 is a block diagram illustrating an example of a hardware configuration of an image forming apparatus according to the second embodiment. With reference to FIG. 25, the hardware configuration of the image forming apparatus according to the present embodiment is described.

As illustrated in FIG. 25, the inkjet printer 1a as an example of the image forming apparatus according to the present embodiment includes a control unit 600, an operation panel 620, an auxiliary storage 621, a scanner 30, and a print head 21. The scanner 30 and the print head 21 are as described above.

The control unit 600 is a control device that comprehensively controls the overall operation of the inkjet printer 1a. The control unit 600 includes a CPU 601, a read only memory (ROM) 602, a RAM 603, a non-volatile random access memory (NVRAM) 604, an ASIC 605, a host interface (I/F) 606, a print controller 607, a motor driving unit 608, an input/output (I/O) 609, and a storage interface (I/F) 610.

The CPU 601 is an arithmetic device that controls actions of the entire inkjet printer 1a. The ROM 602 is a nonvolatile storage device that stores programs executed by the CPU 601 and other fixed data. The RAM 603 is a volatile storage device that temporarily stores image data and the like. The NVRAM 604 is a rewritable nonvolatile storage device for storing data even while the power of the inkjet printer 1a is cut off. The ASIC 605 performs processing of various types of signals relating to image data, image processing including sorting of image data, and processing of input signals to control the entire inkjet printer 1a.

The host I/F 606 is an interface for communicating data and signals with the host side, and in the present embodiment, which is connected to the scanner 30. The host I/F 606 may be connected to not only the scanner 30 but also other external devices. The print controller 607 is a drive circuit that drives and controls the print head 21. The motor driving unit 608 is a driving circuit for driving various motors of a conveying mechanism to convey the recording medium P. The I/O 609 is an interface for inputting detection signals from various sensors. The storage I/F 610 is an interface for exchanging data with an auxiliary storage 621.

The operation panel 620 is an operation unit for inputting and displaying information on the inkjet printer 1a.

The auxiliary storage 621 is a nonvolatile storage device that stores image data received from the host device, image data of a streak detection chart described later, and the like. Additionally, the auxiliary storage 621 stores correction data obtained by a calculation process of a correction coefficient. Specifically, the auxiliary storage 621 stores the correction data for each of a plurality of colors that corresponds to the correction coefficient to eliminate the vertical streak. The correction data corresponds to each of types of screening and each of widths of the vertical streaks. The widths of the vertical streaks are expressed by image data that corresponds to each of the plurality of colors. In addition, in the present embodiment, the auxiliary storage 621 stores four correction data corresponding to four colors, cyan, magenta, yellow, black. The auxiliary storage 621 is, for example, the HDD or the SSD.

The hardware configuration of the inkjet printer 1a illustrated in FIG. 25 is an example and may include other components.

In addition, as described above, the functional block configuration in the image forming apparatus according to the present embodiment is the same as the functional block configuration of the image forming apparatus according to the first embodiment illustrated in FIG. 2. Each functional unit illustrated in FIG. 2 is implemented by the following apparatus or program.

The communication unit 101 is implemented by the host I/F 606 illustrated in FIG. 25. The image output unit 103 is implemented by the print controller 607 and the print head 21 illustrated in FIG. 25. The reading unit 104 is implemented by the scanner 30 illustrated in FIG. 25. The storage unit 107 is implemented by an auxiliary storage 621 illustrated in FIG. 25. The operation unit 109 is implemented by the input function of the operation panel 620 illustrated in FIG. 25. The acquisition unit 102, the detection unit 105, the calculation unit 106, the correction unit 108, and the control unit 110 are realized, for example, by the CPU 601 illustrated in FIG. 25 executing a program.

Some or all of the acquisition unit 102, the detection unit 105, the calculation unit 106, the correction unit 108, and the control unit 110 are not always implemented by software programs, but may be implemented by hardware such as an ASIC or a FPGA.

The seam line of the print heads is described below.

Figure 28:
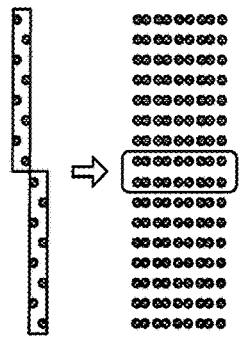
FIG. 28 is an explanatory diagram illustrating a seam line between combined heads in the print head unit.

FIG. 26 is an explanatory diagram illustrating an example of a combined head in the print head unit. FIG. 27 is an explanatory diagram illustrating another example of a combined head in the print head unit. FIG. 28 is an explanatory diagram illustrating the seam line between combined heads in the recording head unit. FIG. 29 is an explanatory diagram illustrating an example of streaks appearing at the seam line between combined heads in the print head unit. The seam line between the print heads 21 in the print head unit 20, which is a unit of a line head type, is described with reference to FIGS. 26 to 29.

As illustrated in FIG. 26, heads each having a length of 1.27 inches, which is an example of a length, are connected in a direction of a nozzle line to form a combined print head (hereinafter referred to as a "combined head"). Further, as illustrated in FIG. 26, the area where the upper and lower print heads overlap each other is referred to as an overlapping area (area A), and an area where the heads do not overlap is referred to as a non-overlapping area (area B).

As illustrated in FIGS. 27A through 27D, there are various ways to combine heads to form the combined head. For example, FIG. 27A illustrates an example in which the number of overlapping nozzles is different from that of the example illustrated in FIG. 26. FIG. 27B illustrates an example in which the number of overlapping heads (i.e., number of colors) is different from that of the example illustrated in FIG. 26. FIG. 27C illustrates an example in which the way the upper and lower heads are connected is different from that of the example illustrated in FIG. 26. FIG. 27D illustrates an example in which resolution in the overlapping area is different from that of the example illustrated in FIG. 26.

What needs particular attention, however, may be the positions of generated dots around the seam line between heads. The number of overlapping nozzles, the number of colors, the arrangement of colors, the way the heads are connected, the density of nozzles, and so on are not limited to the examples illustrated in FIGS. 27A through 27D. In the following, for the sake of convenience of explanation, a description is given of an example in which heads for a four-color configuration are connected in a longitudinal arrangement as illustrated in FIG. 26.

In the inkjet printer with the head configuration in which nozzles are connected as illustrated in FIG. 26, a vertical streak may occur at the seam line between the connected heads.

FIG. 28 is a diagram illustrating the seam line. As illustrated in FIG. 28, the seam line between heads refers to a boundary between the physically adjacent heads of the combined head. As described above, the seam line between the heads causes uneven density of the dot formation on the recording medium P to occur, resulting in the vertical streak.

The vertical streak caused by the seam line is described. As illustrated at the leftmost column in FIG. 29A, the dots adjacent to the seam line may be closer to each other than they are intended to be (i.e., print heads are brought closer to each other in the main-scanning direction), thereby creating a black streak due to an increased dot density at the seam line.

Figure 29A:
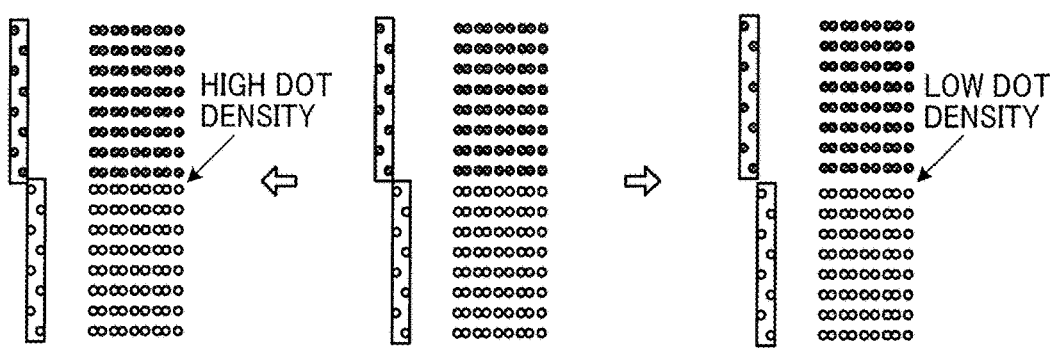
FIGS. 29A and 29B (collectively referred to as FIG. 29) are explanatory diagrams each illustrating an example of streaks appearing at the seam line between combined heads in the print head unit.
Figure 29B:
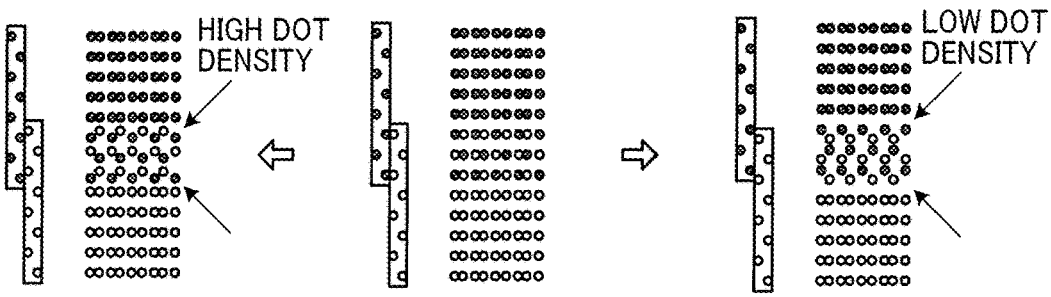

As illustrated at the rightmost column in FIG. 29A, the dots adjacent to the seam line may be farther apart from each other than they are intended to be (i.e., print heads are shifted farther away from each other in the main-scanning direction), thereby creating a white streak due to a decreased dot density at the seam line.

The black streak or white streak refers to a line of uneven image appearance caused by variation in dot density, and does not refer to a black color or white color. Regardless of whether a black ink or a cyan ink is used, a high-density streak appearing due to an increased dot density is referred to as a black streak, and a low-density streak appearing due to a decreased dot density is referred to as a white streak.

The vertical streak that occur when a plurality of nozzles overlap is described. In examples illustrated at the leftmost column and the rightmost column in FIG. 29B, the positions of printed dots are dispersed, so that a contrast between the seam portion is blurred to lessen the appearance of a streak. However, a difference in dot density may easily appear at the boundary between the overlapping portion and the non-overlapping portions. This gives rise to the problem in that the streak is likely to appear at the boundary. It should be noted that the number of overlapping nozzles and the pattern of dot distribution in the overlapping area are not limited to the examples illustrated in FIG. 29.

The vertical streak (the black streak and the white streak) described above that occurs at the seam line of the combined heads and positions near the seam line should be solved by a mechanical adjustment. The vertical streak occurring at the seam line as described above is not the vertical streak to be corrected according to the present disclosure. However, the vertical streak occurring at the seam line and the positions near the seam line, which is formed on the streak detection chart, is not distinguished from the vertical streak to calculate the correction coefficient according to the present disclosure. Therefore, in the present embodiment, the streak detection chart is created by applying a countermeasure as described below.

The streak detection chart to calculate the correction coefficient is described.

Figure 30:
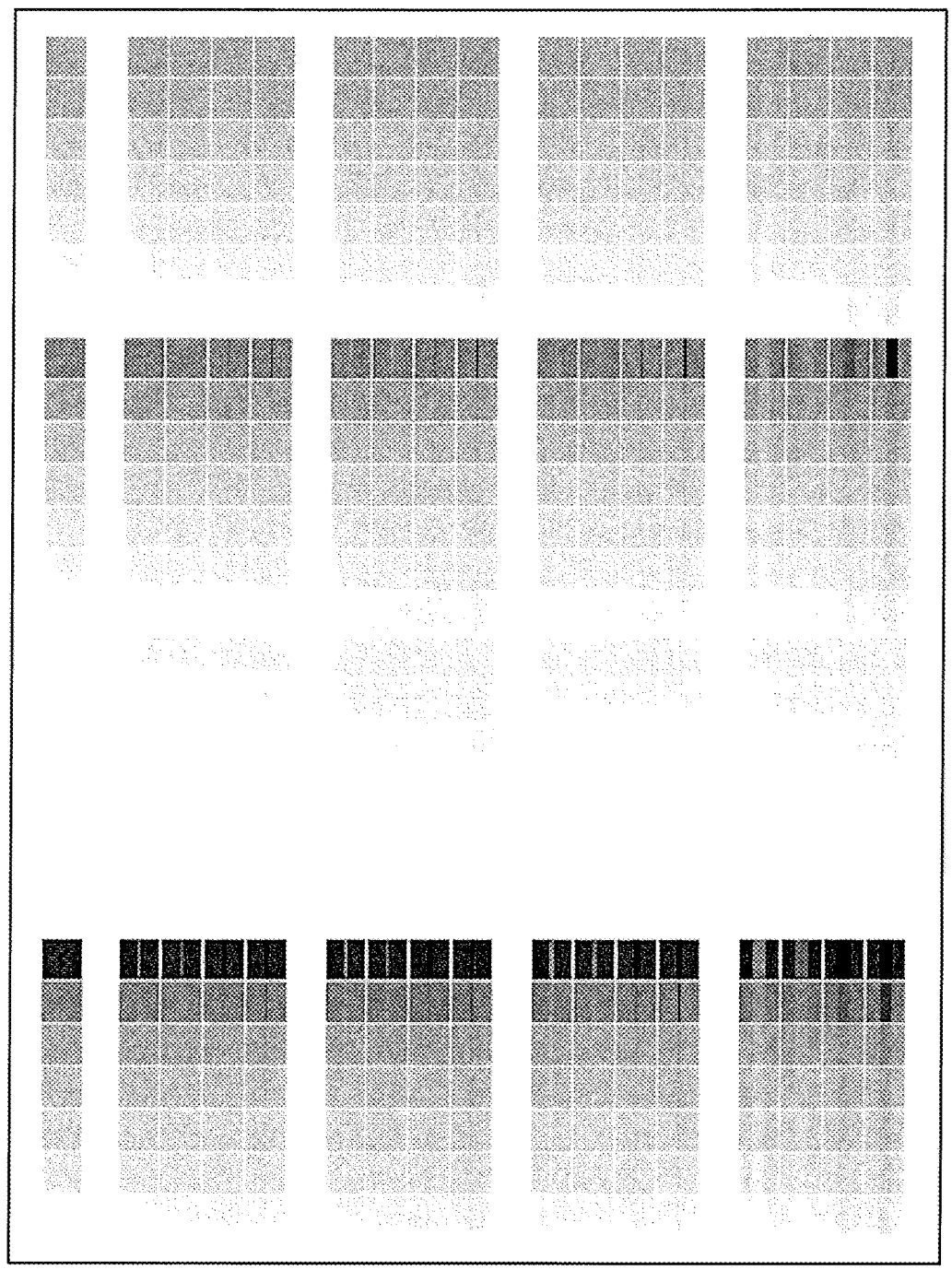
FIG. 30 is a diagram illustrating an example of a streak detection chart including vertical streaks for the image forming apparatus according to the second embodiment.
Figure 31:
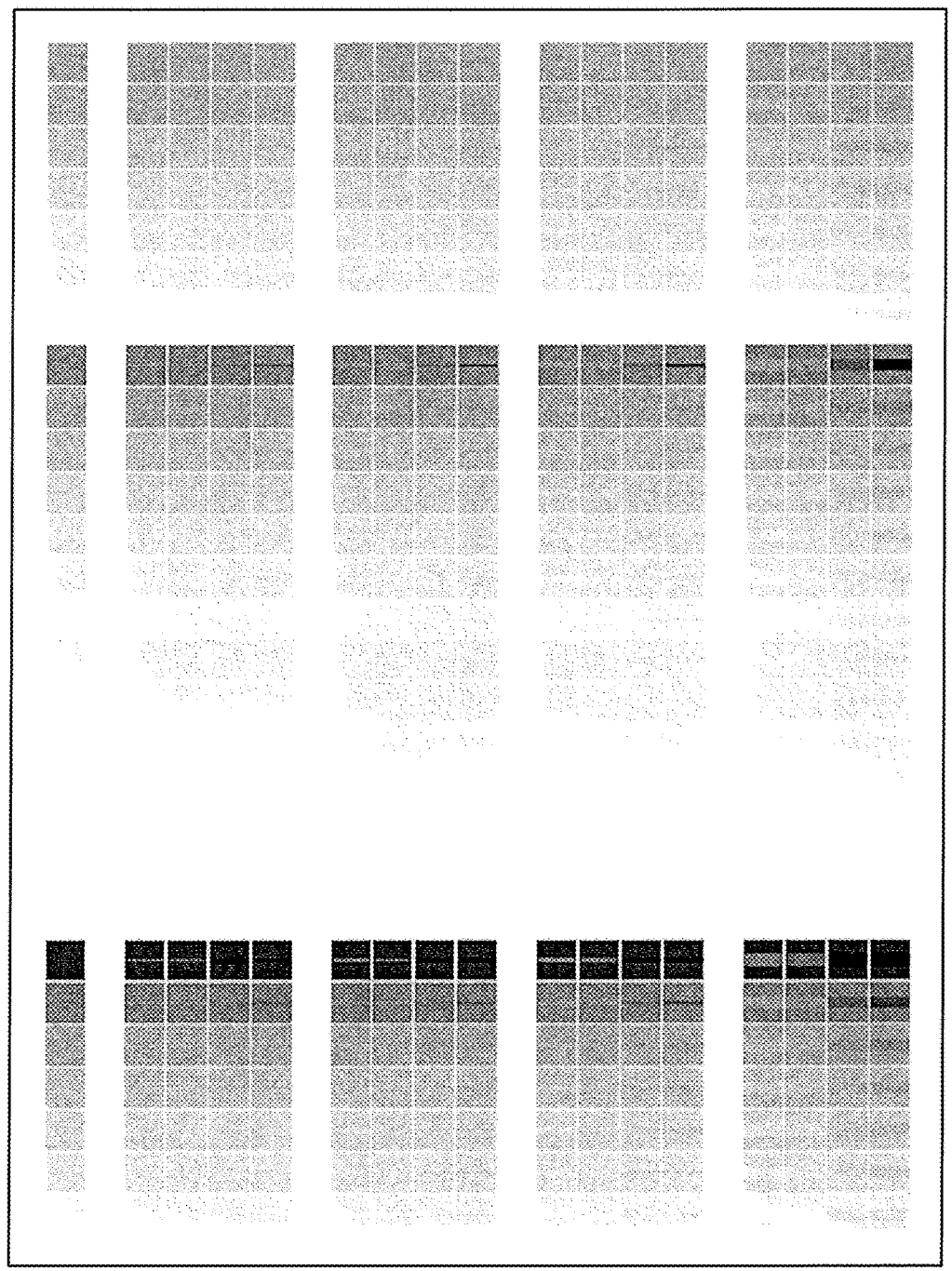
FIG. 31 is a diagram illustrating an example of a streak detection chart including horizontal streaks for the image forming apparatus according to the second embodiment.

FIG. 30 is a diagram illustrating an example of a streak detection chart including vertical streaks for the image forming apparatus according to the second embodiment. FIG. 31 is a diagram illustrating an example of a streak detection chart including horizontal streaks for the image forming apparatus according to the second embodiment. The streak detection chart to calculate the correction coefficient used in the inkjet printer 1a according to the present embodiment is described with reference to FIGS. 30 to 31.

FIG. 30 illustrates the streak detection chart in which the image output unit 103 prints patches on the recording medium using the screening based on image data of the patches, including the vertical streak in each patch, arranged for each color of cyan, magenta, yellow, and black. FIG. 31 illustrates the streak detection chart in which the image output unit 103 prints patches on the recording medium using the screening based on image data of the patches, including the horizontal streak in each patch, arranged for each color of cyan, magenta, yellow, and black.

Because the vertical streak occurring at the seam line and the positions near the seam line, which is formed on the streak detection chart, is not distinguished from the vertical streak to calculate the correction coefficient, the patch in the streak detection chart illustrated in FIG. 30 and FIG. 31 is not formed at the seam line and the positions near the seam line. Therefore, in the calculation of the correction coefficient, the reading unit 104 does not read the brightness of the patch formed at the seam line of the print heads 21 and the portion corresponding to the periphery thereof. The reading unit 104 reads the brightness in the patch formed in the other parts. Not forming the vertical streak occurring at the seam line and the positions near the seam line in the patch of the streak detection chart enables to calculate the suitable correction coefficient in each streak width based on the streak set in image data of each patch. Thus, the similar effect as that of the first embodiment can be obtained.

As described above, the streak detection chart illustrated in FIG. 30 includes patches having vertical streaks, and the streak detection chart illustrated in FIG. 31 includes patches having horizontal streaks. An advantage of the streak detection chart illustrated in FIG. 31 is that it is easy to remove influence of the vertical streak caused by factors of the inkjet printer 1a from detected data because the horizontal streak is originally in the streak detection chart and has different direction from the vertical streak to be corrected.

In the above-described first or second embodiment, a program for realizing at least one functional block of the image forming apparatus may be stored in advance in the ROM or the like. The program to be executed by the image forming apparatus according to the above-described first or second embodiment may be stored in the computer readable recording medium such as a compact disc read only memory (CD-ROM), a flexible disk (FD), a compact disk-recordable (CD-R), and a digital versatile disc (DVD) in the installable format or the executable format and may be offered. The program executed in the image forming apparatus of at least of the first and second embodiments may be stored on a computer connected to a network such as the Internet or the like, and may be downloaded and provided through the network. The program executed in the image forming apparatus of at least of the first and second embodiments may be provided or distributed via a network such as the Internet. The program executed by the image forming apparatus of at least of the first and second embodiments may have a module configuration including at least one of the above-described functional blocks. In actual hardware, the CPU 501, 601 reads out and executes a program from the above-described storage device (for example, auxiliary storage 505, 621). The above-described functional blocks are loaded on the main storage device and generated.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An image forming apparatus comprising:
circuitry configured to
receive brightness values obtained from an image printed based on image data, the image including a plurality of streaks and non-streak portions having image density differences with the plurality of streaks,
detect
a first streak width of a first streak,
a first brightness difference between a brightness value of the first streak and a brightness value of a non-streak portion,
a second streak width of a second streak wider than the first streak width, and
a second brightness difference between a brightness value of the second streak, with the second streak width that is wider than the first streak width, and a brightness value of a non-streak portion,
calculate a correction coefficient corresponding to the first streak width based on the first brightness difference and the second brightness difference, which is a difference between the brightness value of the second streak, with the second streak width that is wider than the first streak width, and the brightness value of the non-streak portion, and
correct image data of an image density corresponding to the first streak width based on the correction coefficient calculated.

2. The image forming apparatus according to claim 1, wherein the circuitry is configured to calculate the correction coefficient corresponding to the first streak width by dividing the second brightness difference by the first brightness difference.

3. The image forming apparatus according to claim 2, wherein the correction coefficient calculated is larger than 1.

4. The image forming apparatus according to claim 1, wherein the image printed based on the image data is a streak detection chart having a patch including two or more streaks with different streak widths.

5. The image forming apparatus according to claim 4, wherein the circuitry is configured to calculate the correction coefficient corresponding to the streak width based on the image data including the plurality of streaks.

6. The image forming apparatus according to claim 4, wherein the circuitry is configured to calculate the correction coefficient corresponding to the different streak widths of the two or more streaks included in the patch of the streak detection chart detected.

7. The image forming apparatus according to claim 4, wherein the streak detection chart is printed by a plotter having combined heads based on image data including no patch at a portion corresponding to a seam line between the combined heads.

8. The image forming apparatus according to claim 4, wherein the streak detection chart is formed by screening of a plotter, and
the circuitry is configured to calculate the correction coefficient corresponding to a type of screening.

9. The image forming apparatus according to claim 4, wherein the circuitry is configured to detect the first streak width, the first brightness difference, the second streak width, and the second brightness difference with the streak detection chart including a plurality of streaks whose directions are different from a direction in which the streak detection chart is sent in a plotter that forms the streak detection chart.

10. The image forming apparatus according to claim 4, wherein the streak detection chart is formed by an amplitude modulation screen of a plotter so that an angle between a direction of the amplitude modulation screen and a direction in which the streak detection chart is sent in the plotter is same as an angle between the direction of the amplitude modulation screen and a direction of the plurality of streaks.

11. The image forming apparatus according to claim 1, wherein the first streak and the second streak have a same image density difference.

12. The image forming apparatus according to claim 1, further comprising:
a plotter configured to form an output image on a recording medium based on output image data; and
a scanner configured to read a brightness value of the output image formed on the recording medium,
wherein the circuitry is configured to detect a streak width of a streak having a direction in which the recording medium is sent in the plotter and detect a streak corresponding to the first streak width, and
wherein the circuitry is configured to correct an image density value of the output image data corresponding to a position of the streak corresponding to the first streak width in a main scanning direction, using the correction coefficient corresponding to the first streak width.

13. The image forming apparatus according to claim 12, further comprising:
a memory to store the correction coefficient corresponding to the first streak width, a streak width detected, and a position of a streak corresponding to the first streak width in the main scanning direction,
wherein the circuitry is configured to correct an image density value of the output image data corresponding to the position of the streak corresponding to the first streak width in the main scanning direction, using the correction coefficient corresponding to the first streak width, a streak width detected, and a position of a streak corresponding to the first streak width in the main scanning direction that are stored in the memory.

14. The image forming apparatus according to claim 1, wherein the plurality of streaks have streak widths determined according to an exponential function.

15. An image forming method comprising:
forming, on a recording medium, a plurality of streaks based on predetermined image data, each of the plurality of streaks having an image density difference from an adjacent region that is a non-streak portion;
reading brightness values of the non-streak portion and the plurality of streaks;
detecting, based on the brightness values read by the reading,
a first streak width of a first streak,
a first brightness difference between a brightness value of the first streak and a brightness value of the non-streak portion corresponding to the first streak,
a second streak width of a second streak wider than the first streak width, and a second brightness difference between a brightness value of the second streak, with the second streak width that is wider than the first streak width, and a brightness value of the non-streak portion corresponding to the second streak:

calculating a correction coefficient corresponding to the first streak width based on the first brightness difference and the second brightness difference, which is a difference between the brightness value of the second streak, with the second streak width that is wider than the first streak width, and the brightness value of the non-streak portion; and correcting image data of an image density value corresponding to the first streak width, based on the correction coefficient calculated by the calculating.

* * * * *